United States Patent [19]

Wong et al.

[11] Patent Number: 5,819,298

[45] Date of Patent: Oct. 6, 1998

[54] FILE ALLOCATION TABLES WITH HOLES

[75] Inventors: Thomas K. Wong, Pleasanton; Peter W. Madany, Fremont, both of Calif.

[73] Assignee: Sun Microsystems, Inc., Palo Alto, Calif.

[21] Appl. No.: 669,632

[22] Filed: Jun. 24, 1996

[51] Int. Cl.[6] .................................................. G06F 17/30
[52] U.S. Cl. .......................... 707/205; 707/204; 707/101; 711/171; 360/48
[58] Field of Search .................................... 395/442, 479; 348/7; 707/206, 1, 200, 205, 101, 204; 360/72.1, 48; 711/171

[56] References Cited

U.S. PATENT DOCUMENTS

| | | | |
|---|---|---|---|
| 4,912,629 | 3/1990 | Shuler, Jr. ................................ | 707/206 |
| 4,941,059 | 7/1990 | Grant ...................................... | 360/72.1 |
| 4,989,134 | 1/1991 | Shaw ....................................... | 707/206 |
| 5,008,820 | 4/1991 | Christopher, Jr. et al. ................. | 707/1 |
| 5,029,125 | 7/1991 | Sciupac .................................... | 707/205 |
| 5,155,484 | 10/1992 | Chambers, IV ........................... | 341/55 |
| 5,237,675 | 8/1993 | Hannon, Jr. ............................... | 395/425 |
| 5,261,088 | 11/1993 | Baird et al. .............................. | 707/206 |
| 5,422,762 | 6/1995 | Jerbic ....................................... | 360/48 |
| 5,481,701 | 1/1996 | Chambers, IV ........................... | 707/101 |
| 5,551,020 | 8/1996 | Flax et al. ................................ | 707/101 |
| 5,574,907 | 11/1996 | Jernigan, IV et al. ..................... | 707/1 |
| 5,586,301 | 12/1996 | Fisherman et al. ...................... | 395/479 |
| 5,592,669 | 1/1997 | Robinson et al. ........................ | 707/206 |
| 5,608,901 | 3/1997 | Letwin ..................................... | 707/205 |
| 5,608,905 | 3/1997 | Weinstein ................................ | 707/205 |
| 5,617,566 | 4/1997 | Malcolm .................................. | 707/204 |
| 5,623,651 | 4/1997 | Jernigan, IV ............................. | 707/200 |
| 5,623,654 | 4/1997 | Peterman ................................. | 707/206 |
| 5,630,093 | 5/1997 | Holzhammer et al. .................. | 395/442 |
| 5,631,694 | 5/1997 | Aggarwal et al. ........................ | 348/7 |
| 5,652,857 | 7/1997 | Shimoi et al. ........................... | 395/440 |
| 5,652,965 | 8/1997 | Rawlings, III ........................... | 711/171 |
| 5,675,769 | 10/1997 | Ruff et al. ............................. | 395/497.04 |
| 5,701,432 | 12/1997 | Wong et al. ............................. | 395/457 |

OTHER PUBLICATIONS

McKusick et al. "Performance Improvements and Functional Enhancements in 4.3 BSD (UNIX)", USENIX Assoc. Summer Conf. Proceedings, viii + 612, pp. 519–531, Jun. 1985.

Burrows, et al., On–line Data Compression in a Log–structured File System, 1992, Proceedings of 5th International Conference on Architectural Support for Programming Languages and Operating Systems, pp. 2–9.

*Primary Examiner*—Wayne Amsbury
*Assistant Examiner*—Charles L. Rones
*Attorney, Agent, or Firm*—Beyer & Weaver, LLP

[57] ABSTRACT

A file system includes a file allocation table (FAT) and a file allocation table extension. Each FAT element of the file allocation table corresponds to a unique cluster on disk and represents the status of that cluster. These FAT elements are indexed by a cluster number that corresponds to that cluster on disk. Each element of the file allocation table extension does not correspond to any region on disk. Writing a file divided into clusters to disk first involves determining whether the cluster may be represented by a hole. If not, the cluster is written to disk at a particular cluster number and a status indicator is stored in the file allocation table at a FAT element indexed by that cluster number indicating that the cluster is allocated. If the cluster may be represented by a hole, a status indicator is stored in the file allocation table extension at an element indicating that the cluster is not stored on the disk of the computer. The status indicators in the FAT and FAT extension form a linked list representing the clusters of a file. The holes of the FAT extension may also be used to store compressed files. A plurality of file allocation table extensions may be used. One file allocation table extension may indicate holes in stored data that result from expanded files having clusters full of zeros. Additional file allocation table extensions may be used to represent holes in stored data that result from the use of various compression algorithms on the data. Each FAT extension may represent holes resulting from the use of a different compression algorithm.

35 Claims, 12 Drawing Sheets

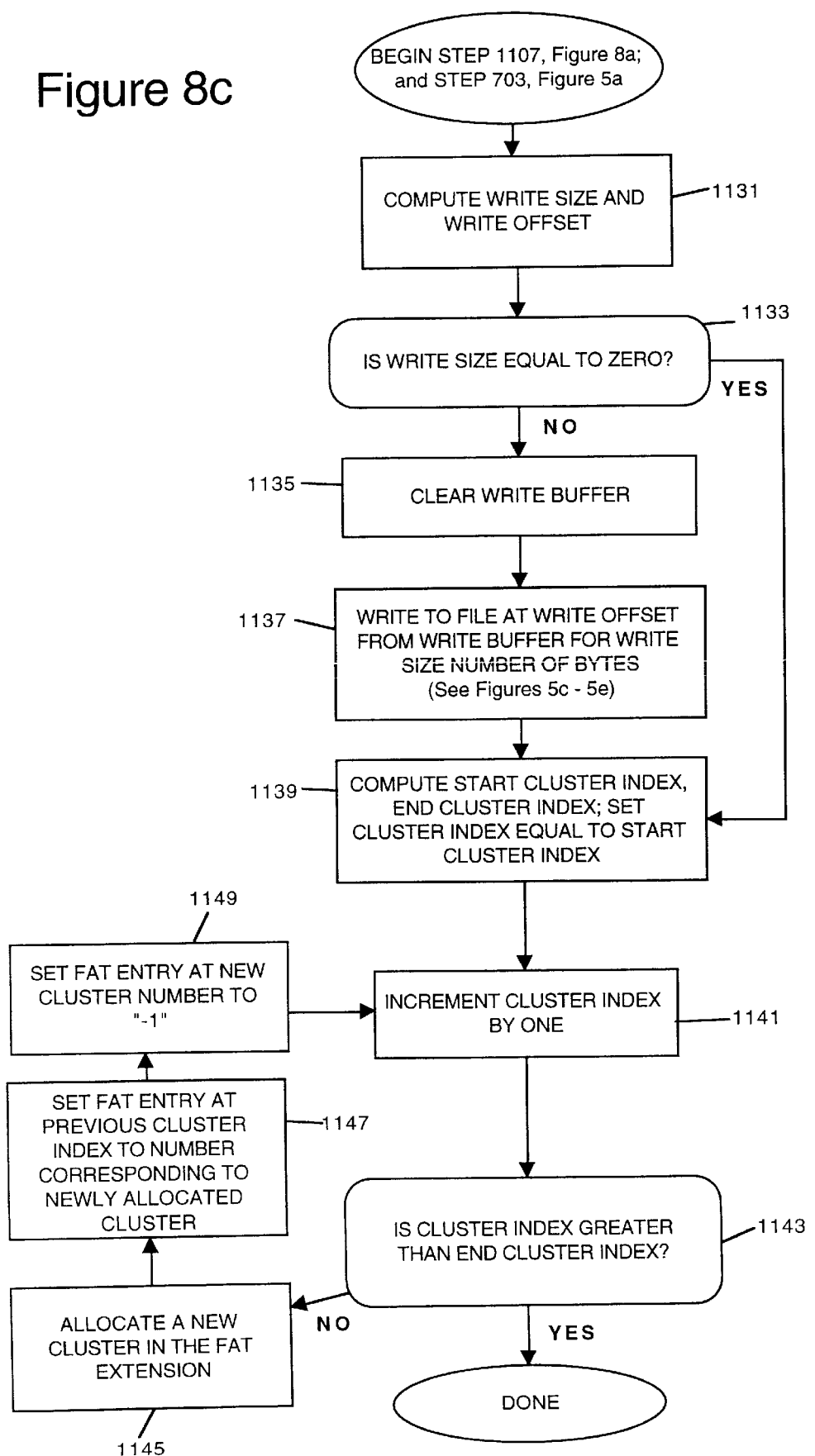

FILE ALLOCATION TABLES WITH HOLES

FIELD OF THE INVENTION

The present invention relates generally to file system management in a computing system. More specifically, the present invention relates to a file system that incorporates the use of "holes" in a file allocation table.

BACKGROUND OF THE INVENTION

File system services provided by the operating system of a computing system are responsible for managing the allocation of space of storage media. These file system services also provide a logical framework to the users of the computer for accessing data stored in the storage media. The logical framework usually includes a hierarchy of directory structures to locate a collection of files that contain user-named programs or data. The use of directories and files relieves the users from having to find the actual physical location of the stored information in a storage medium. Many different types of file systems are known. By way of example, popular file systems include various UNIX operating system based file systems and the WINDOWS NT™ file system. One UNIX™ file system that incorporates the use of "holes" is described in "The Design and Implementation of the 4.3BSD UNIX Operating System", S. Leffler, M. McKusick, M. Karels and J. Quarterman, chapter 7, Addison-Wesley, 1989. The WINDOWS NT™ file system is described in "Inside the Windows NT File System", H. Custer, Microsoft Press, 1994.

A typical file system implementation, hereafter referred to as a file system, converts from the user abstraction of a file as an array of bytes to the structure imposed by the underlying physical medium of the storage medium. Typically, magnetic disks are organized into fixed size sectors. Although the user may wish to write a single byte to a file, the disk may read or write only in multiples of sectors. Thus, in order to modify a single byte in a file, the file system must first read in the sector containing the byte to be modified, then replace the affected byte, and finally write the sector back to the disk. This operation of converting a user's random access to an array of bytes into reads and writes of disk sectors is known as "Block I/O."

To effectively support Block I/O, a file system typically divides the array of bytes in a file into a set of fixed size clusters. A cluster may be defined as the minimum size that may be allocated for a disk. For example, if a file system's cluster size is 8192 bytes, then the first cluster allocated to a file would contain bytes 0 to 8191 of the file, and the next cluster of the file would contain bytes 8192 to 16383, etc. These clusters of a file are then stored to a disk in units of a cluster as well. The file system also divides the sectors of a disk into a set of fixed size clusters. The size of each cluster is called the cluster size. Each cluster of a disk is assigned a unique address, called a cluster number. Cluster numbers are assigned consecutively, starting from 0. If a disk has N clusters, then cluster number N–1 shall be the last cluster of the disk. If each cluster of a disk contains 16 sectors, then cluster number 0 corresponds to sectors numbered 0 to 15 on the disk, and cluster number 1 corresponds to sectors numbered 16 to 31 of the disk, etc. Thus, the conceptual notion of a cluster within a file is eventually written to disk at a particular cluster that has a unique cluster number.

A particular file system implementation uses a file allocation table (FAT) to manage the allocation of clusters of a disk. These file system implementations that use a file allocation table are hereafter referred to as FAT file systems. The MSDOS™, OS/2™, WINDOWS 3.1™ FAT and the WINDOWS 95™ VFAT operating systems are examples of FAT file systems that are available commercially.

Essentially, a FAT file system uses one file allocation table (FAT) for each disk under its control. Each entry in a FAT for a disk is associated with (or maps to) a cluster of the disk. The first FAT entry is associated with the first cluster of the disk. The next FAT entry is associated with the next cluster of the disk, and so on. If a disk has N Clusters, then the FAT for the disk shall have N entries, and the last FAT entry shall be associated with the last cluster of the disk. In other words, it can be said that the cluster number for each cluster on the disk is used as an index into the FAT to access the FAT entry for that particular cluster on the disk.

The contents of each FAT entry for a particular cluster on the disk is itself a cluster number (representing another physical cluster on the disk) and this FAT entry is used to indicate:

(1) whether the particular cluster (associated with the FAT entry) has been allocated or not. The special cluster number 0 is typically used to represent an unallocated cluster.

(2) whether this cluster is the last (or only) cluster in a file. The last cluster of a file is usually represented by an invalid cluster number such as "–1" in the FAT entry for that particular cluster.

(3) the next cluster of the file. In other words, for a particular cluster of a file that is stored on disk, its cluster number (where it is stored on disk) serves as an index to the FAT, and the value stored at this FAT entry will be another cluster number representing where the next cluster of the file is stored on the disk.

A file in a FAT file system having M clusters will use M entries in the FAT. One of the directories in a FAT file system will contain a directory entry that identifies the cluster number of the first cluster of a file. And the FAT entry that corresponds to the cluster number of the first cluster of a file identifies the cluster number of the second cluster of the file, and so on. In this fashion, the FAT entries corresponding to the cluster numbers on disk for the clusters of a file form a linked list. The FAT entry for the last cluster of a file will contain an invalid cluster number such as "–1", to indicate that this cluster is the last cluster of the file. The minimum space allocation unit in a FAT file system is one cluster. Since the clusters of a file may not be allocated consecutively, each read or write operation of a cluster usually requires one I/O operation.

While most applications write data to a file sequentially, some applications write data randomly to any offset in the file. For example, an application may create a new file and then write several bytes starting at offset M within the file. In this case, bytes between offset 0 and offset M–1 of the file will have never been written, but they are logically part of the file and are generally treated as if they all have the value zero. Also, the use of a hashing function in a database may result in clusters of a file containing nothing but zeros. In a FAT file system, clusters of a file that are completely zero are still treated as containing data; a cluster will be allocated on disk and a cluster full of zeros will be written to disk.

Since it is wasteful to store a physical cluster for a corresponding logical cluster of a file that has never been written (i.e. full of zeros), one technique employed by some file systems such as most UNIX operating system based file systems is to avoid the actual allocation in mass storage for such a zero cluster. The file system designates a special physical cluster address, usually "0", that represents the address of a special, but non-existent, physical cluster that is full of zeroes. This special physical cluster is called a "hole." However, a FAT file system implementation has no such capability for representing holes. Because the FAT entries correspond to the cluster numbers on disk and form a linked list, a hole cannot be represented because it would break the linked list. However, a UNIX™ file system may represent holes because the mapping from logical clusters to physical clusters is not done in a linked list but rather in a mapping table.

Since it wasteful to store a cluster full of zeros, it would be desirable to enhance a FAT file system so that allocating clusters that are full of zeroes would be avoided. Accordingly, it would be desirable to enhance a FAT file system such that the use of "holes" is possible.

Also, when files are compressed fewer number of clusters are needed, resulting in a number of clusters in a compressed file that are also full of zeros. It would further be desirable to be able to represent compressed files in a FAT file system thus allowing both compressed and expanded files on a disk to coexist.

SUMMARY OF THE INVENTION

An aspect of the present invention relates to a file system of a computer system that is able to store data to mass storage. Each file has a file name and any number of data segments. The file system has a file table with a plurality of file name elements and a plurality of corresponding initial status indicator elements. The file table stores each file name as one of the plurality of file name elements. Also included in the file system is a file allocation table (FAT) with a plurality of FAT elements. Each FAT element of the file allocation table corresponds to a unique region of mass storage and represents the status of that unique region in mass storage. Additionally, there is a file allocation table extension that is similar in structure to the FAT. The file allocation table extension has a plurality of extension elements. Extension elements of the file allocation table extension do not correspond to a region in mass storage. Those data segments of a file that contain data are represented in the file allocation table, and those data segments that may be represented by a hole are represented in the file allocation table extension. Thus, files that contain "holes" may be stored by way of using the file allocation table extension to represent these "holes". In this fashion, the present invention advantageously extends a FAT file system to allow the representation of "holes".

Another embodiment of the present invention relates to a method of storing data within such a file system. The elements of the FAT may be indexed by a cluster number that corresponds to that region of mass storage. The file system also includes a file allocation table extension that also has elements. None of the elements of the file allocation table extension correspond to any region in mass storage. Writing a file divided into clusters to mass storage includes the following steps. Requesting that a cluster be written to mass storage. Next, determining whether the cluster may be represented by a hole. When it is determined that the cluster may be represented by a hole, a status indicator is stored in the file allocation table extension at an element, thereby indicating that the cluster is not stored in the mass storage of the computer. Thus, clusters that are "holes" may be stored in the file allocation table extension.

In another embodiment, a file stored on disk that may contain holes has a plurality of clusters that are represented in a linked fashion in the file allocation table and in the file allocation table extension. A method for writing a cluster includes the following steps. Requesting that a cluster represented in a memory of the computer be written to mass storage, the cluster corresponding to a cluster that is already represented either on disk or as hole. Next, determining whether the cluster is represented as a hole in the file allocation table extension. When it is determined that the cluster is represented as a hole in the file allocation table extension, first allocating space in mass storage for the cluster, next writing the cluster to the space allocated and then updating the file allocation table and the file allocation table extension to reflect that the cluster is no longer a hole. Thus, the file allocation table extension may be updated when real data is written to a location that was once a "hole".

In one embodiment data that has been stored on disk is represented in a linked fashion in the FAT and the FAT extension. A first data segment is read by determining whether the data segment is represented in the FAT or in the FAT extension. A data segment with a segment number that is less than N is represented in the FAT, whereas a data segment with an extension number that is N or greater is represented in the FAT extension. If the data segment is represented in the FAT extension, this indicates that a hole is present, and the read buffer is simply initialized to a predetermined value associated with the hole. Thus, a data segment represented in the FAT extension indicates the presence of a "hole".

In another aspect of these embodiments, the file system is arranged to store compressed files using the holes available in the FAT extension. The file system may include a plurality of file allocation table extensions wherein one of the file allocation table extensions is arranged to indicate holes in stored data that result from files having clusters with zeros. And additional file allocation table extensions may be used to represent holes in stored data that result from the use of various compression algorithms on the data. Each FAT extension may represent holes resulting from the use of different compression algorithms. Thus, "holes" due to the use of compression algorithms may also be represented in a FAT extension of the present invention.

BRIEF DESCRIPTION OF THE DRAWINGS

The invention, together with further advantages thereof, may best be understood by reference to the following description taken in conjunction with the accompanying drawings in which:

FIG. 5b is a flowchart representing a compute write size operation used in one embodiment of the write operation of FIG. 5a.

FIG. 5d is a flowchart representing a compute and set file size operation used in one embodiment of the write operation of FIG. 5a.

FIG. 6b is a flowchart representing a compute read size operation used in one embodiment of the read operation of FIG. 6a.

FIG. 6c is a flowchart representing a read cluster operation used in one embodiment of the read operation of FIG. 6a.

FIG. 8b is a flowchart representing a truncate file operation used in one embodiment of the set file size operation of FIG. 8a.

FIG. 8c is a flowchart representing a lengthen file operation used in one embodiment of the set file size operation of FIG. 8a.

DETAILED DESCRIPTION OF THE INVENTION

The present invention extends a FAT file system to support the use of files with "holes". It also uses this concept of "holes" within a FAT file system to support file system level compression. In this way, both compressed and expanded files in a FAT file system may coexist. Also, new disks may be configured with additional FAT entries to support compression.

Normally, a disk with N clusters in a FAT file system will have a file allocation table (FAT) that contains N entries, representing the clusters of the disk numbered 0 to N−1. One embodiment of the present invention provides a file allocation table extension (FAT extension) that allows for additional entries numbered from N to M−1. Thus, a total of M entries are available in the FAT and FAT extension. For example, if a disk has 10 clusters, and a FAT extension has 5 entries, the entries in the FAT will be numbered from 0 to 9, and the FAT extension entries will be numbered from 10 to 14 for a total of M=15 entries. This FAT extension represents those clusters that are all zeros within the file system and as such provides for a way to keep track of such clusters without having to write them to disk. Thus, for a cluster that is all zeros, this cluster is not written to disk but is assigned a cluster number of N or greater. Thus, any cluster of a file with a cluster number greater than or equal to N is non-existent and is treated as if it were a cluster that is full of zeroes. This representation of a zero cluster in the FAT extension is called a "hole". The implementation of a FAT extension is discussed below.

It should be appreciated that clusters other than those full of zeros may be treated as "holes." For example, the convention used may be that clusters that contain all "1's" are considered as being blank and that such clusters should not be stored to disk but should be represented as a "hole". Also, a cluster that contains a uniform pattern of bits may be considered as not appropriate for writing to disk and may be represented as a "hole." Any type of data pattern represented in a cluster that need not be written to disk may be represented as a "hole."

Figure 1:
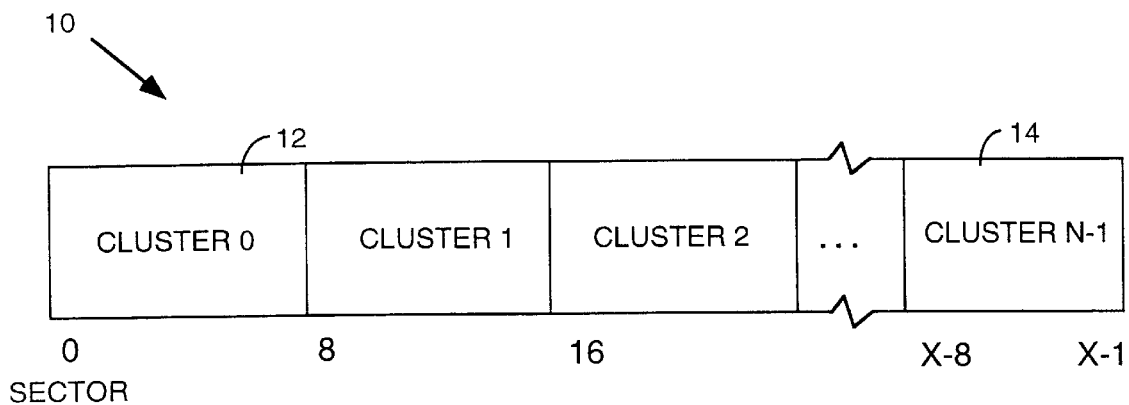
FIG. 1 shows symbolically the linear physical address space of a disk within a computing system.

Referring now to FIG. 1, shown at 10 is a symbolic representation of a disk within a computing system. Shown is the linear physical address space of the disk. The disk contains sectors of data that are organized into clusters. These clusters are shown symbolically as being linear, however, a disk controller would be responsible for allocating an individual cluster to a particular region of the disk. Shown in particular is a disk having at 12 a cluster 0 up through 14 a cluster N−1. The disk contains N clusters. Each cluster may contain eight sectors, for example. For example, cluster 0 would correspond to sectors 0–7, cluster 1 would correspond to sectors 8–15, etc. A total of X sectors may be present on the disk. It should be appreciated that this disk as mass storage in a computer may take a variety of forms. The disk may be any type of hard disk that uses magnetic media, a floppy disk, or the like. Also the disk may be any other type of physical storage in a computer such as an optical disk, RAM, or the like.

Because a file system or disk controller in a computing system may write data to these clusters continuously or randomly, it is important to keep track of which clusters on the disk contain data, i.e. which clusters are allocated. It is also important to keep track of which clusters contain data for a given file. One method to keep track of such information is through the use of a File Allocation Table (FAT).

Figure 2:
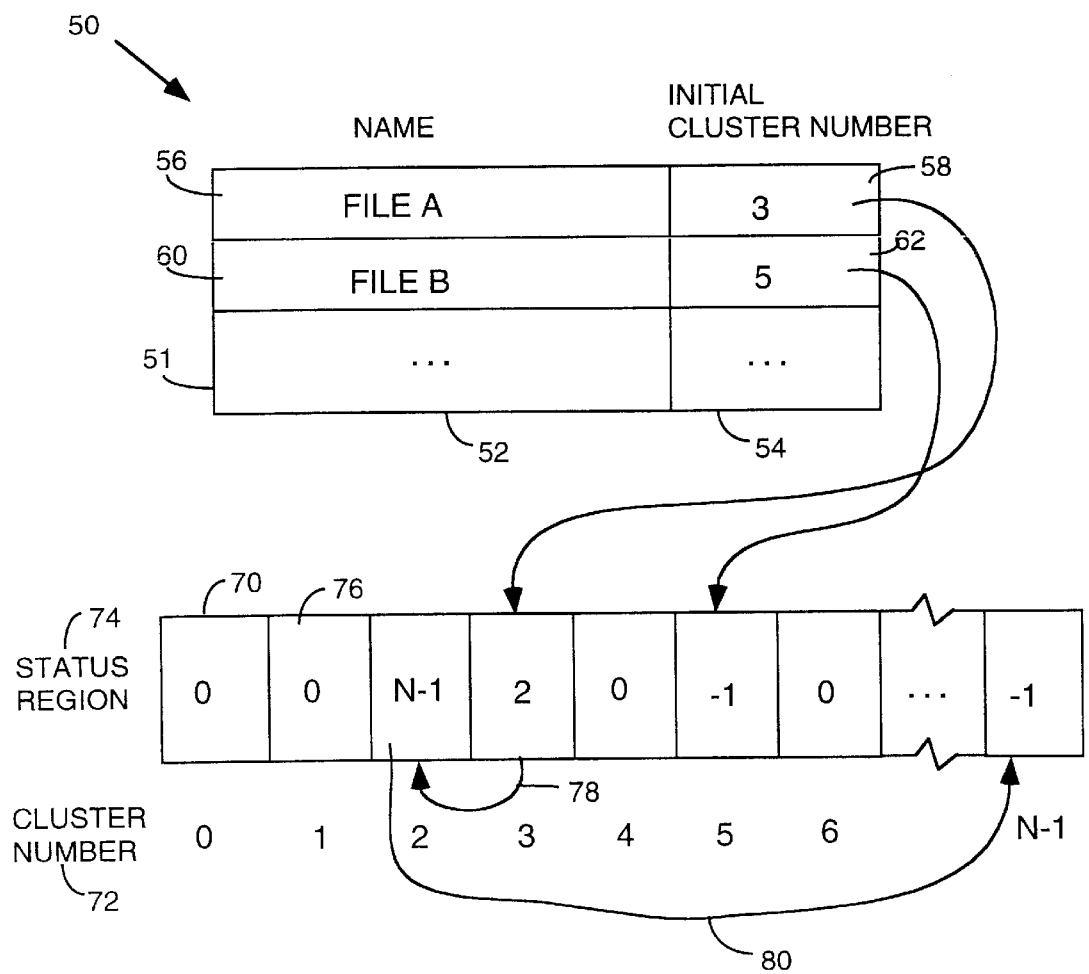
FIG. 2 shows the use of a prior art file allocation table within a file system.

FIG. 2 at 50 shows one implementation of a prior art file system in which a file directory 51 is able to access a file allocation table 70 in order to keep track of the status of the clusters on the disk. The file directory 51 may represent a complex hierarchy of directories within a file system as will be appreciated by those of skill in the art. The file directory 51 contains a Name field 52 and an Initial Cluster Number field 54. The Name field lists files within the file system and the Initial Cluster Number field indicates by cluster number the first cluster on disk that is used by that file to store its data.

The structure of the file allocation table 70 will now be described. A file allocation table (FAT) may be implemented using a wide variety of data structures. It is preferable to implement a file allocation table 70 using an array in which the index of the array represents a cluster on the disk and the data at the location in the array according to the index represents the status of that cluster. In other words, the cluster number serves as an index into the FAT to access a corresponding element of the array that indicates the status of the cluster on the disk identified by its cluster number. For example, the FAT 70 is shown as having an index Cluster Number 72 that ranges from 0 to N−1. The elements of the array are a status region 74 that will indicate not only the status of a particular cluster on the disk, but also the location of the next cluster within a file. A wide variety of status information for a particular cluster may be contained within the status region 74. By way of example, it is possible to keep track of whether a cluster has been allocated or not, whether it is the last cluster within a file, etc.

For example, the FAT 70 operates to indicate the status of all of the clusters of the disk 10 shown in FIG. 1. For example, in determining the status of cluster 1, one may refer to the FAT 70. To determine the status of cluster 1 an index of 1 is used as a cluster number to gain access to the status region 76 for that cluster. As shown at 76, the status of cluster 1 is represented by a 0, that indicates that this cluster is currently unallocated. A positive number of 1 or greater may indicate that the cluster is currently allocated to a particular file. Also a status of "−1" for a particular cluster may indicate that this cluster is the last cluster containing data for a particular file. It should be appreciated that other numerical conventions may be used to represent the status of a cluster.

The use of the FAT 70 with the file directory 51 will now be described. Within the file directory 51 is a File A 56 that has an Initial Cluster Number of 3. This indicates that a first cluster of data for File A is stored in cluster 3 on the disk. This Initial Cluster Number of 3 also serves as a pointer 58 to the FAT 70. This pointer 58 points to the status region as identified by the index 3 that represents the status of cluster number 3. The status region for the index 3 is the number 2 that indicates not only that this cluster 3 has been allocated but also that the next cluster containing data for this file is cluster 2. This number 2 also serves as a pointer 78 to the status region of the FAT as indexed by cluster number 2. Contained within this status region for the cluster number 2 is the quantity N−1 that indicates not only that cluster 2 has been allocated but also that the next cluster that contains data for this file is located at cluster N−1. This quantity N−1 also serves as a pointer 80 to the status region of the FAT as indexed by the quantity N−1. Contained within this region is the quantity "−1" that indicates not only that cluster N−1 has been allocated to this file, but also that this cluster N−1 is the last cluster containing data for this file.

The File B is represented in a similar manner. Within the file directory 51 is a File B 60 that has an Initial Cluster Number of 5. This indicates that a first cluster of data for File B is stored in cluster 5 on the disk. This Initial Cluster Number of 5 also serves as a pointer 62 to the FAT 70. This pointer 62 points to the status region as identified by the index 5 that represents the status of cluster number 5. The status region for the index 5 is the number "−1" that indicates not only that this cluster 5 has been allocated but also that this cluster 5 is the last cluster containing data for this File B. Of course, other files within the file system may be represented in the file directory and the FAT. Files that are empty may be indicated by storing a "0" in the file directory at the Initial Cluster Number.

Figure 3:
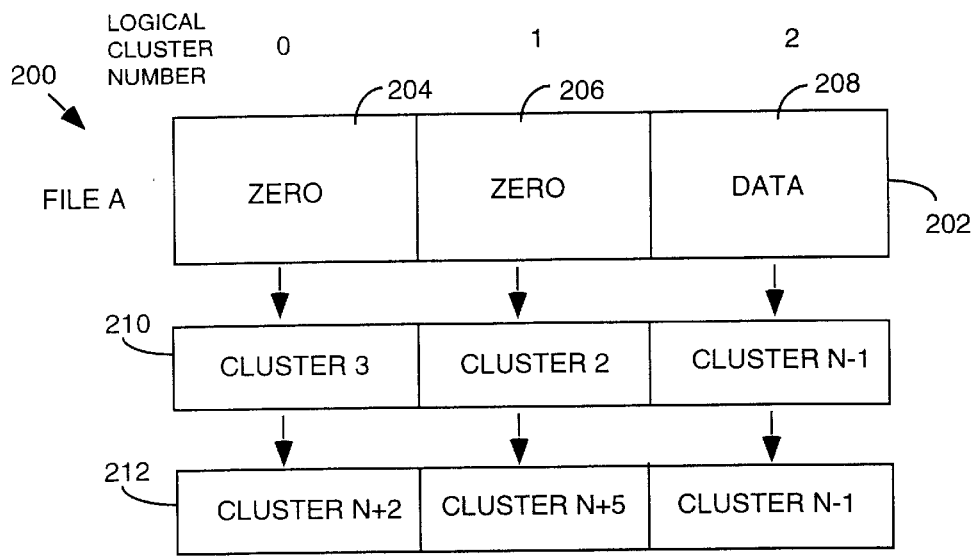
FIG. 3 shows symbolically various types of data within a file and where that data may be represented in a file system.
Figure 4:
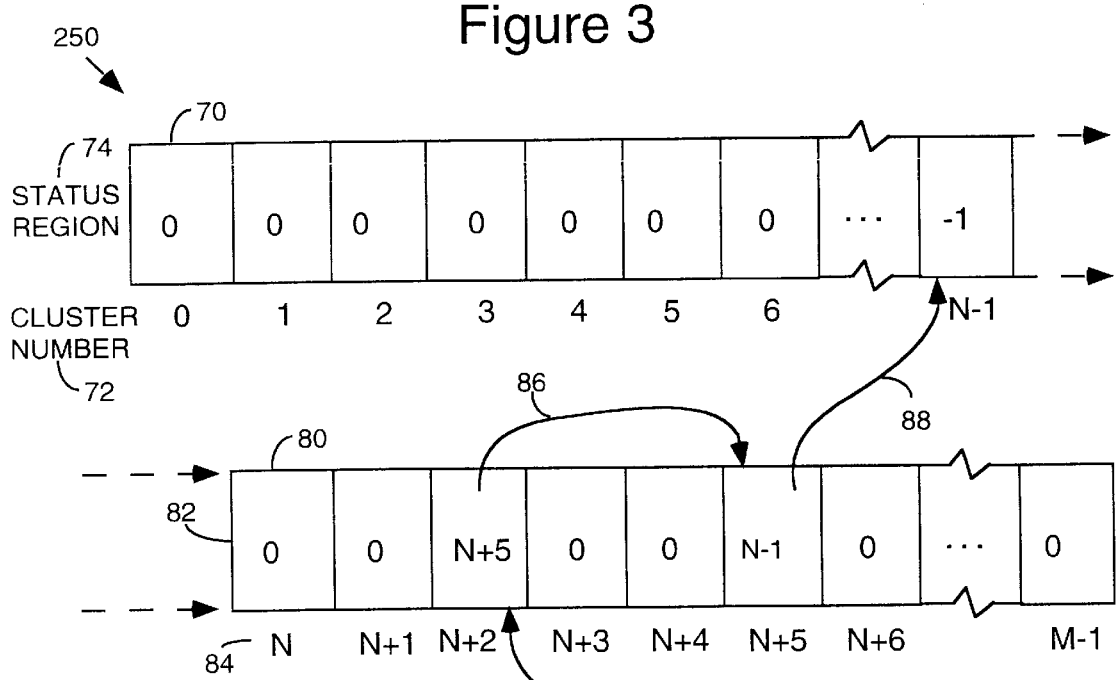
FIG. 4 shows a file allocation table and a file allocation table extension within a file system according to one embodiment of the present invention.
Figure 4:
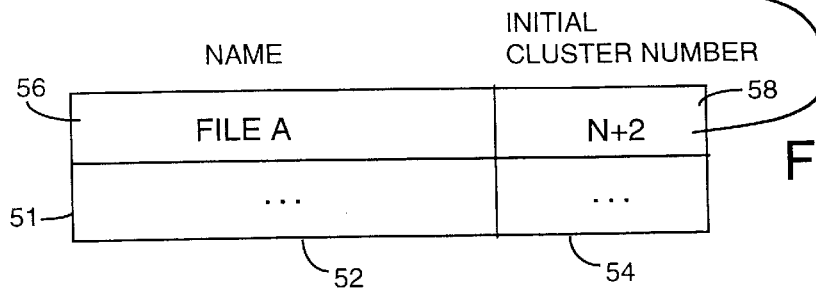

Referring now to FIGS. 3 and 4 an embodiment of the present invention is illustrated in which an extension of a FAT is used to represent the concept of "holes" within a particular file. FIG. 3 shows at 200 a particular file A and symbolically where its data may be stored on the disk. For example, file A 202 contains three logical clusters of data 204, 206 and 208. The clusters 204 and 206 each contain all zeroes whereas the cluster 208 contains actual data. In previous implementations of a prior art FAT as shown in FIG. 2 the cluster 204 is stored at cluster 3 on the disk, the cluster 206 is stored at cluster 2 on the disk, and the cluster 208 is stored at cluster N−1 on the disk. This storage of the data of File A on the disk is shown symbolically at 210. As can be appreciated, if clusters 204 and 206 contain nothing but zeroes, it is wasteful to store complete clusters full of zeroes on the disk. Accordingly, an extension of a FAT may be used to represent these zero clusters and avoid the allocation of a physical cluster on disk for zero clusters. This representation 212 will be explained below.

FIG. 3 also shows a conceptual array for the File A that may be used with the present invention. Shown at 210 is an array representation of File A showing for each logical cluster of File A where that cluster is represented in the file system. For example, if File A has logical clusters numbered 0 through 2, then a cluster index representing these clusters may be used to index the array to access an element. Thus, logical cluster 0 of File A is located at cluster 3 on disk, logical cluster 1 of File A is located at cluster 2 on disk, etc. Thus, the logical clusters for File A serve as a cluster index into the conceptual array for that file while the elements of the array are the numbers of the clusters on disk where the logical clusters are actually stored. This conceptual array with its cluster index and elements will be used in the implementation of the FAT extension as explained below.

FIG. 4 shows at 250 an embodiment of the present invention in which a traditional FAT 70 is enhanced by a FAT extension 80 that is used in conjunction with the file directory 51. The use of this FAT extension 80 will be discussed with reference to the representation of the storage of File A of FIG. 3. As discussed above, a FAT 70 is represented by an array in which the index of the array is a cluster number 72 that corresponds to a physical cluster on the disk, and the data stored at the element corresponding to the index represents the status of that particular cluster whose number is indicated by the index.

A FAT extension 80 may also be represented by an array that also has as an index a cluster number 84 and a status region 82. It may be possible to implement this FAT extension 80 using a wide variety of equivalent data structures. As the FAT extension 80 is an extension of the FAT 70 its index begins with cluster number N up to a cluster number M−1. As the disk of the computing system still only contains N physical clusters, the index cluster number 84 of the FAT extension 80 that ranges from N to M−1 does not correspond to a physical cluster on the disk. As such, an index into the FAT extension 80 may be used to represent that a cluster of a file contains all zeroes instead of allocating an actual physical cluster.

In this example, file A has logical clusters 0 and 1 of all zeroes and a logical cluster 2 that does contain data. In the prior art, these first two clusters of file A that contain zeroes were allocated to actual physical clusters on the disk. However, by using the FAT extension 80 these first two clusters of file A that contain zeroes may be represented by using entries within the FAT extension 80 instead of allocating an actual physical cluster on the disk. Shown is a file directory 51 that has within it a File A 56 that has an Initial Cluster Number of N+2. This reference N+2 serves as a pointer 58 to an entry within the FAT extension 80 indexed by the cluster number N+2. Because this initial cluster for the File A is located at the cluster number N+2 this indicates that this initial cluster is full of zeroes. At the cluster number N+2 is the quantity N+5. The quantity N+5 at this location indicates the next cluster for File A is also represented within the FAT extension 80 at the cluster number N+5. The quantity N+5 serves as a pointer 86 to the entry located at cluster number N+5. Because this second cluster is represented at the cluster number N+5, this means that this second cluster is also completely full of zeroes. Within the FAT extension 80 at the cluster number N+5 is the quantity N−1. The quantity N−1 also serves as a pointer 88 back to the FAT 70 to the entry index by the cluster number N−1. Because this third cluster of File A is indexed by the cluster number N−1 this means that the third cluster does actually contain data and is stored at cluster N−1 on the disk. And because the FAT extension 70 at cluster number N−1 contains the status of "−1", this means that this third cluster is the last cluster containing data for this file.

Thus, it can be seen that physical clusters for File A with a cluster number greater than or equal to N contain only zeros and are not represented on disk, whereas physical clusters with a cluster number of N−1 or less contain data and have allocated disk space. This representation is shown symbolically at 212. It should also be appreciated that the clusters on the physical disk that contain data for a particular file as well as the zero clusters may be found by searching from the file directory through a form of a linked list until the quantity "−1" is reached. In this fashion, a conceptual array for the File A may be created that keeps track of where each logical cluster of file A is represented.

Figure 5A:
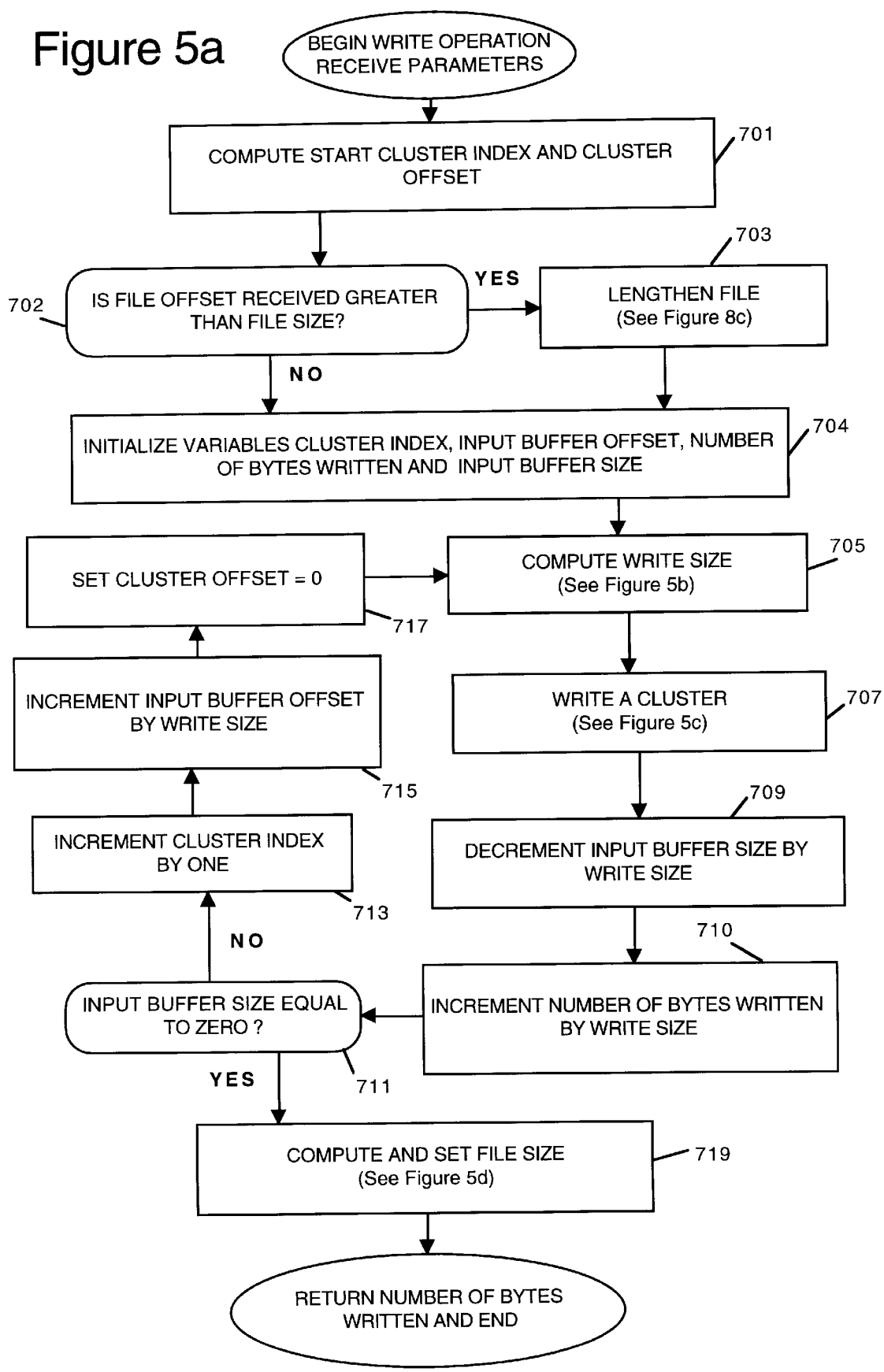
FIG. 5a is a flowchart representing a write operation in accordance with one embodiment of the present invention.

Turning now to FIG. 5a, a flowchart representing the write operation for an embodiment of the present invention is shown. Typically, a file system will accumulate data until the amount of modified data reaches or exceeds a particular size. The write operation will then write the data to disk. The write operation begins by receiving input parameters. Four variables are input to the write operation: the Input Buffer, the Initial Input Buffer Size, a File Offset and an Open File Descriptor.

The variable Input Buffer is an address that indicates a data buffer that contains the data to be written to the disk. The Initial Input Buffer Size indicates the size of the Input Buffer in bytes. File Offset is the offset in the file at which data will be written. The Open File Descriptor allows the write operation to access the File Size. The Open File Descriptor may also point to the file directory and may be implemented as will be appreciated by one of skill in the art. The File Size indicates the size of the file that is being written to in bytes. One more variable is available from the file system meta data. It is the variable Cluster Size that represents the size of a cluster in bytes.

After the write operation request has been received, three variables are computed in step 701. They are the Start Cluster Index and the Cluster Offset. The Start Cluster Index represents the first logical cluster of the file to be written. The Start Cluster Index is the quotient of the File Offset divided by the Cluster Size. The Cluster Offset is the remainder of the File Offset divided by the Cluster Size. The variable Cluster Offset identifies the starting location within the cluster where the data will be written. After these variables have been calculated, control moves to step 702.

Step 702 tests whether the File Offset received is greater than the File Size. If so, then the file must be lengthened, this step being performed in step 703. This lengthen file operation will be discussed in more detail below with reference to FIG. 8c. After the file is lengthened or if lengthen is not needed, the logic proceeds next to step 704 where four variables are initialized. They include the Cluster Index, the Input Buffer Offset, Number of Bytes Written and Input Buffer Size. Cluster Index identifies the logical cluster of the file to be written and it is set equal to the Start Cluster Index. The variable Cluster Index will serve as an index into the conceptual array for the file discussed above. The Input Buffer Offset indicates the point in the Input Buffer from which the data is being written, and it is initialized to zero. The Input Buffer Offset is the offset within the Input Buffer from which data will be written to the disk. Also, the Number of Bytes Written is set equal to zero and the Input Buffer Size is set equal to the Initial Input Buffer Size.

In step 705 a variable Write Size is computed. This variable indicates the number of bytes to be written in one iteration of this operation and Write Size must be less than or equal to the size of a cluster. This step will be explained in more detail below with reference to FIG. 5b. After the Write Size has been determined, a (first) cluster is written to disk in step 707. This cluster writing step will be explained in more detail below with reference to FIG. 5c. After the first cluster has been written, the Input Buffer Size variable is decremented by Write Size in step 709. Then, in step 710 the variable Number of Bytes Written is incremented by Write Size to indicate the total number of bytes that have been written to the disk. At this point, a determination is made as to whether the last cluster for the Input Buffer has been written. This is accomplished by comparing the Input Buffer Size to zero in step 711. If Input Buffer Size equals zero then the write operation is complete and control moves to step 719. If not, then the write operation is not complete and control moves to step 713. Step 713 increments the cluster index by one in order to keep track of which cluster to write. Cluster index is used to index the conceptual array of the file in order to obtain the cluster number.

Next, in step 715 the variable Input Buffer Offset is incremented by Write Size. In step 717 the variable Cluster Offset is set equal to zero because any partial cluster has been written, and remaining clusters will be written from their beginning. From step 717 control loops back to step 705 and the operation continues to another iteration as discussed above. In step 719 the variable File Size is computed and set to indicate the new End of File for the file on the disk. This step will be explained in more detail below with reference to FIG. 5d. Next, the write operation ends and the variable Number of Bytes Written is returned to the calling entity.

Figure 5B:
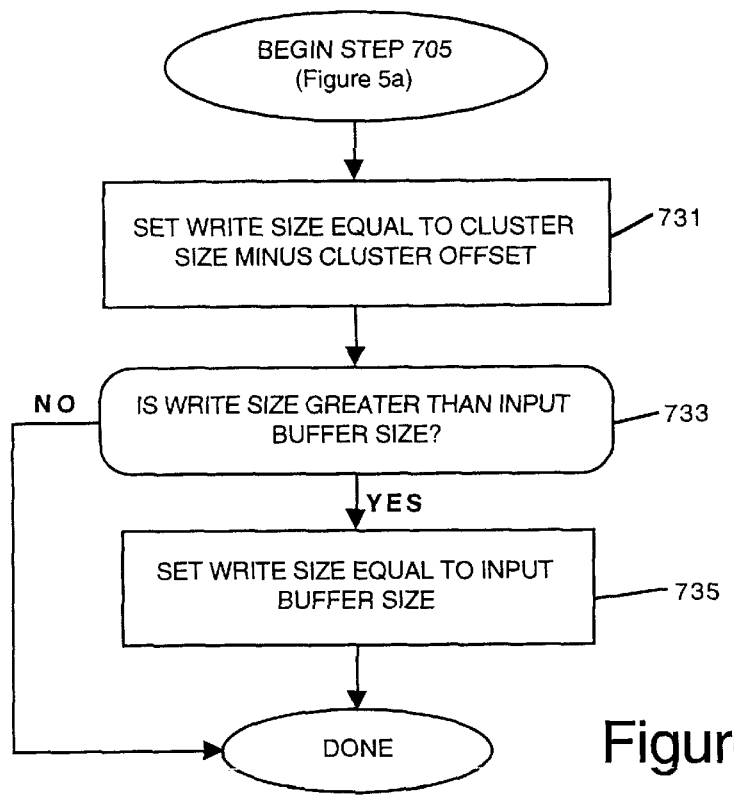

FIG. 5b shows a flowchart for computing the Write Size for the number of bytes to be written. For the first and last clusters written, Write Size may not be the same as the Cluster Size because a write may be beginning or ending within a cluster. For intermediate clusters, Write Size will be the same as Cluster Size. In step 731 the Write Size is set equal to the Cluster Size minus the Cluster Offset. The Write Size must be less than or equal to the size of a cluster. In the first iteration of the write operation of FIG. 5a the Write Size may be smaller than a Cluster Size if there is a Cluster Offset. That is, if the data to be written to a disk begins in the middle of the cluster. On subsequent iterations through the write operation Write Size will be equal to the size of a cluster because the Cluster Offset will have been set to zero in step 717. Step 733 tests whether Write Size is greater than the Input Buffer Size. If the Write Size is not greater than the Input Buffer Size this indicates that the data remaining in the Input Buffer to be written is greater than a cluster and the Write Size remains at the size of a cluster and this step 705 is done.

However, if Write Size is greater than the Input Buffer Size, this indicates that the end of the Input Buffer has been reached, and that the data remaining to be written is less than the size of a cluster. In that case, in step 735 Write Size is set equal to the data remaining, i.e., the Input Buffer Size. Note that the Input Buffer Size changes as iterations are made through the write operation because the variable Input Buffer Size is decremented by Write Size in step 709. After step 735, step 705 compute write size is done.

Figure 5D:
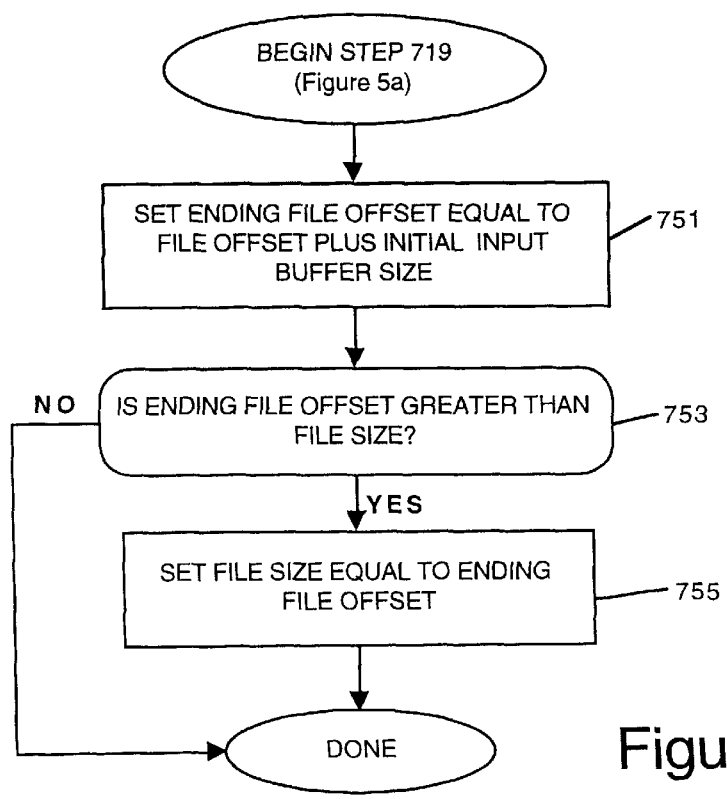
Figure 5C:
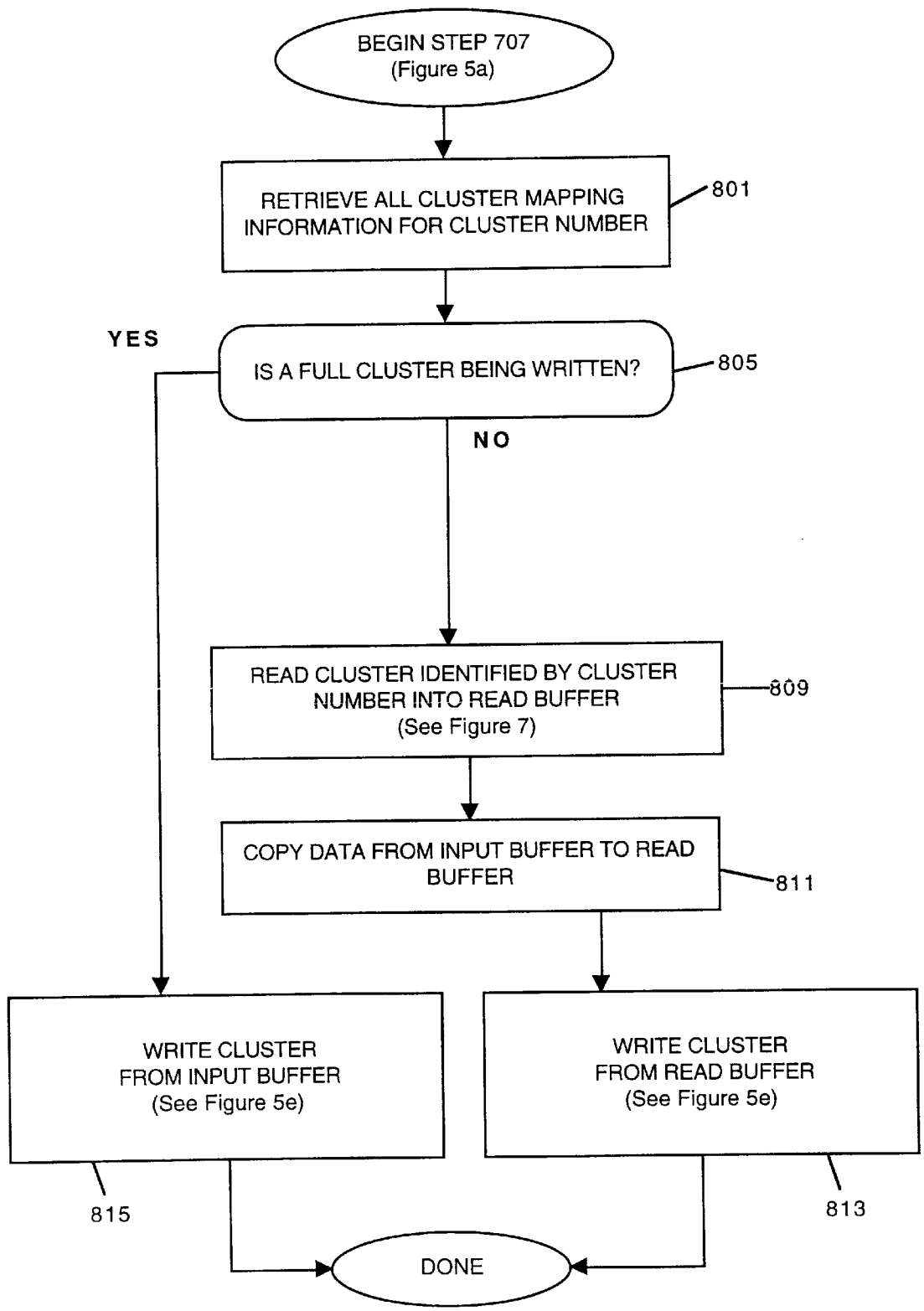
FIG. 5c is a flowchart representing a write cluster operation used in one embodiment of the write operation of FIG. 5a to write a whole or partial cluster.

FIG. 5c shows a flowchart for writing a cluster. In step 801 all cluster mapping information for the Cluster Index is retrieved. For example, the variable Open File Descriptor may be used to access the file directory, which in turn may be used follow the linked list to determine where the logical cluster of the file is represented. For example, the logical cluster of the file indicated by the Cluster Index may be stored on disk at a particular Cluster Number, or it may be represented as a "hole" in the FAT extension. In either case, the logical cluster of the file will have an associated Cluster Number, the Cluster Number being less than or equal to N−1 for a logical cluster stored on a disk and greater than or equal to N for a logical cluster that is represented as a "hole" in the FAT extension.

Step 805 tests whether a full cluster is being written. If a full cluster is being written from the Input Buffer to the disk then the cluster may be written directly. This test may be performed by comparing Write Size to Cluster Size and if Write Size is not equal to Cluster Size, it indicates that a full cluster is not being written. If a full cluster is being written, in step 815 this cluster is written from the Input Buffer to the disk. This cluster from the Input Buffer is written to disk using the data stored in the Input Buffer at the location Input Buffer Offset. This step 815 will be explained more fully below with reference to FIG. 5e.

If a full cluster is not being written then this cluster must first be read from the disk before being written to as shown in step 809. Steps 809 to 813 are used when a full cluster is not being written, such as when either the Input Buffer begins at an intermediate location within a cluster or ends at an intermediate location within a cluster. If the Input Buffer begins at the beginning of a cluster and ends at the end of a cluster then these steps are not needed. The following variables are used in steps 809 to 813: Cluster Number is the cluster at which the data will be retrieved from the disk, Read Buffer is a temporary data buffer that will contain the data to be retrieved, Cluster Offset is the offset within the Read Buffer at which data from the Input Buffer will be copied to, Input Buffer contains the data to be written, and Input Buffer Offset is a location within the Input Buffer from which the data will be written to disk.

In step 809 the cluster associated with Cluster Number is read from the disk and stored in the Read Buffer. This step 809 will be explained more fully below with reference to FIG. 7. In step 811 data from the Input Buffer is copied to the Read Buffer. This step is performed by copying Write Size bytes of data from the location at the Input Buffer Offset of the Input Buffer to the location at the Cluster Offset of the Read Buffer. In step 813 the cluster in the Read Buffer is written to the file on disk. This step will be explained more fully below with reference to FIG. 5e. After steps 815 and 813 have finished this step 707 is done.

FIG. 5d is a flowchart for calculating the File Size variable. This procedure checks whether the file has increased in size, and if so, adjusts the File Size variable. The variable File Size indicates the size of the file in bytes. In step 751 the variable Ending File Offset is set equal to File Offset plus the Initial Input Buffer Size. As the variable File Offset indicates the offset from the beginning of the file on disk and the variable Initial Input Buffer Size is the total size of the data being written, the variable Ending File Offset will now indicate the new End of File, if the file has increased in length. Step 753 tests whether the Ending File Offset is greater than File Size. If Ending File Offset is not greater than File Size this indicates that the file has not increased in length and the variable File Size is not changed and this procedure is done. If, however, the Ending File Offset is greater than the File Size then in step 755 the variable File Size is reset to be equal to the variable Ending File Offset. After this step 755 the procedure is done.

Figure 5E:
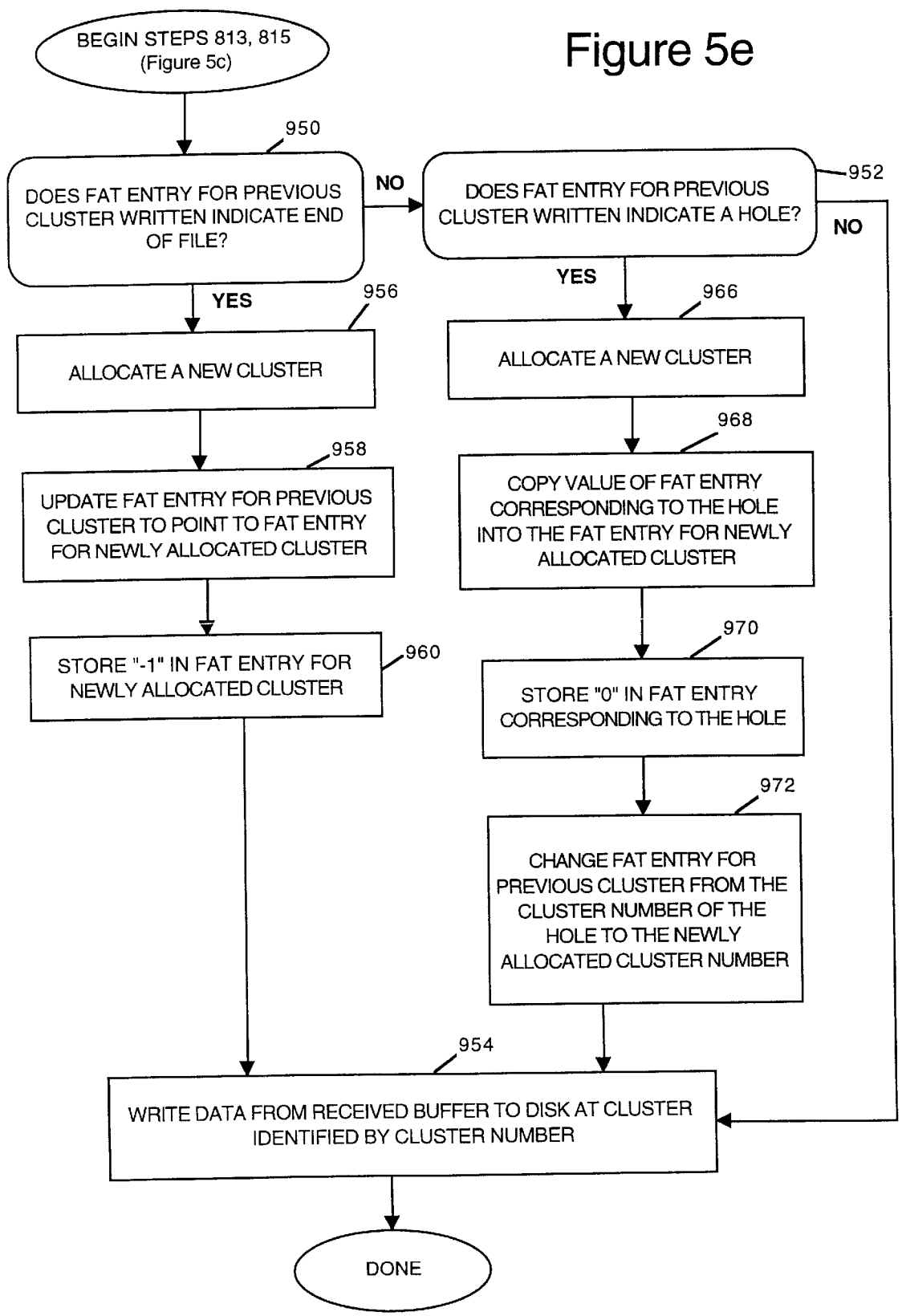
FIG. 5e is a flowchart representing a write cluster operation used in one embodiment of the write cluster operation of FIG. 5c to write a whole cluster.

Referring now to FIG. 5e the procedure for updating the file allocation table (FAT) or the FAT extension in the context of writing a cluster will now be described. At this point in the overall write operation, the logical cluster to be written has been mapped to its associated Cluster Number, and it is this cluster that is to be written to disk. However, because this cluster may be after the end of file, or may have been a "hole" previously, certain steps must be performed first.

Step 950 determines whether the FAT entry for the previous logical cluster indicated the end of the file. The previous cluster is that logical cluster of the file that precedes the current cluster to be written. If the previous cluster indicated the end of the file (by a "−1" entry in the FAT), this means that the file is being added to and a new cluster must be allocated and the FAT updated. Thus, if the answer to step 950 is "YES" control moves to step 956 in which a new cluster on the disk is first allocated. In step 958 the FAT entry for the previous cluster is updated from the quantity "−1" to a quantity that points to a FAT entry for the newly allocated cluster. Next in step 960 a "−1" is stored as the FAT entry for the newly allocated cluster because this newly allocated cluster is currently the end of the file. Next in step 954 the data from the received buffer is written to the newly allocated cluster on disk.

If, however, the answer to step 950 was "NO" this means that the previous cluster was not the last cluster of the file. Step 952 tests whether the FAT entry for the previous cluster indicates a "hole" is present for the current cluster to be written. As described above with reference to FIGS. 3 and 4, the FAT entry for a given cluster may indicate that the next cluster is stored as a "hole" if the FAT entry is greater than or equal to N. If no "hole" is indicated, this means that the entry for the previous cluster indicates an actual physical cluster on disk to which data may be written for the current cluster. In such a case, control moves to step 954 and the data is written to this physical cluster as discussed above. If, however, the answer to step 952 is "YES", this indicates that the current cluster to be written is currently indicated as being a "hole". In such a situation, because an actual cluster needs to be written, this entry representing a "hole" must be removed from the FAT extension, a new cluster must be allocated and the FAT and FAT extension must be updated.

In step 966 a new cluster is allocated on disk to contain the data to be written. In step 968 the value of the FAT entry within the FAT extension that corresponds to the "hole" is copied into the FAT entry for the newly allocated cluster. Next in step 970 the quantity "0" is stored as the FAT entry corresponding to the "hole" in the FAT extension. In step 972 the FAT entry for the previous cluster is changed from indicating a "hole" to the Cluster Number for the newly allocated cluster. Next in step 954 the cluster is written to disk. The received buffer will either be the Input Buffer or the Read Buffer as determined by FIG. 5c.

Figure 6A:
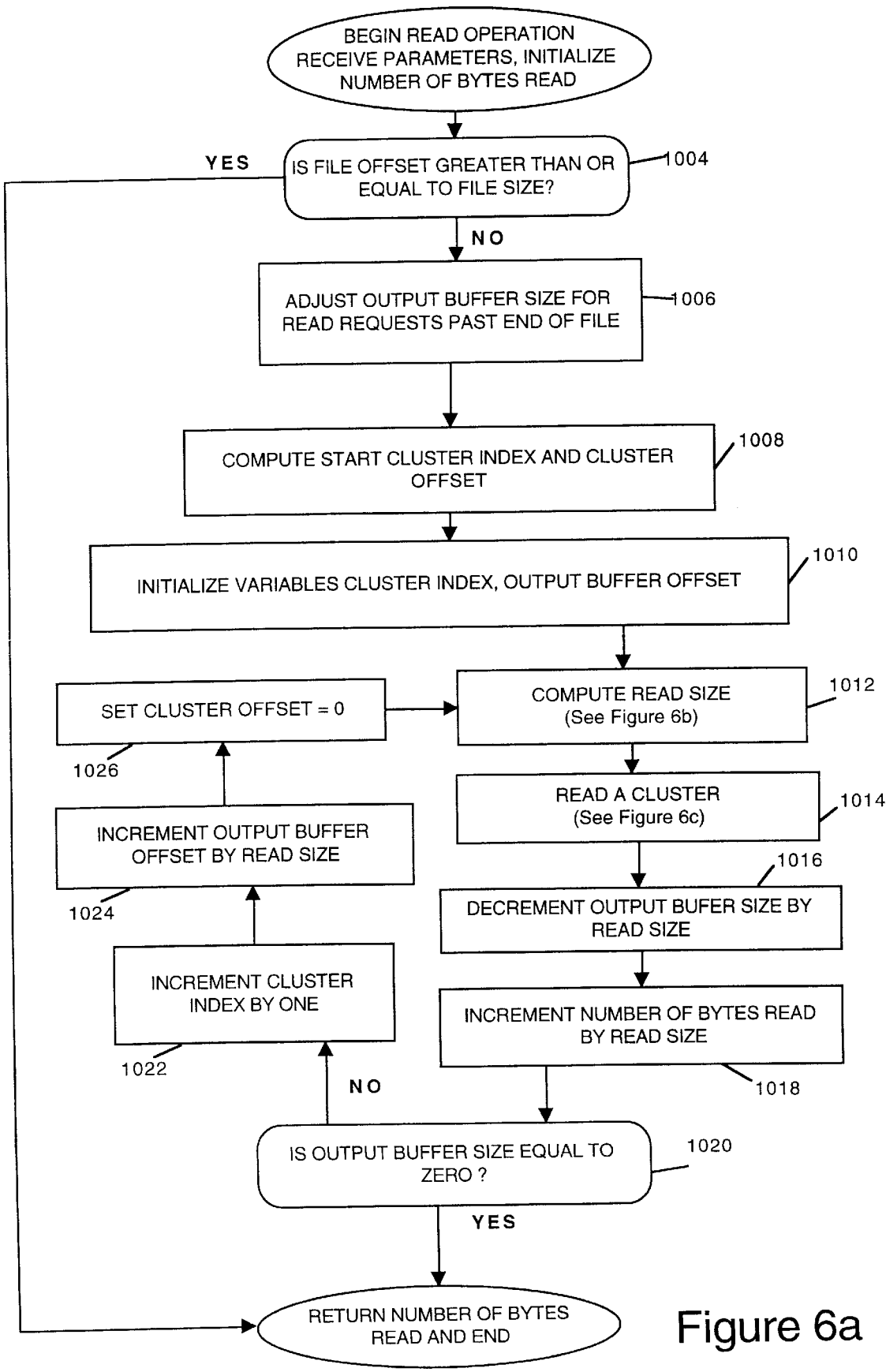
FIG. 6a is a flowchart representing a read operation in accordance with one embodiment of the present invention.
Figure 6B:
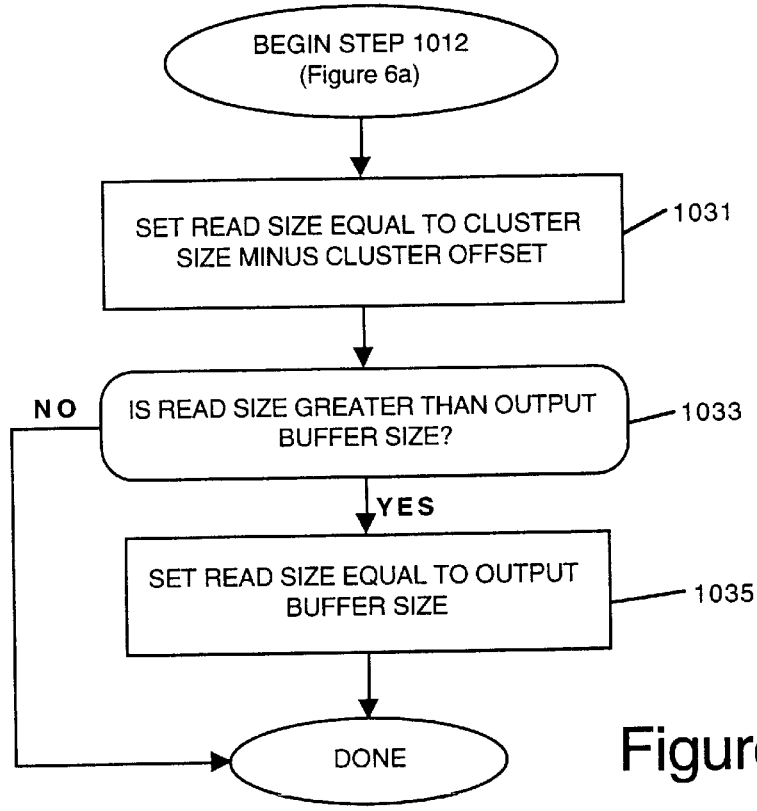
Figure 6C:
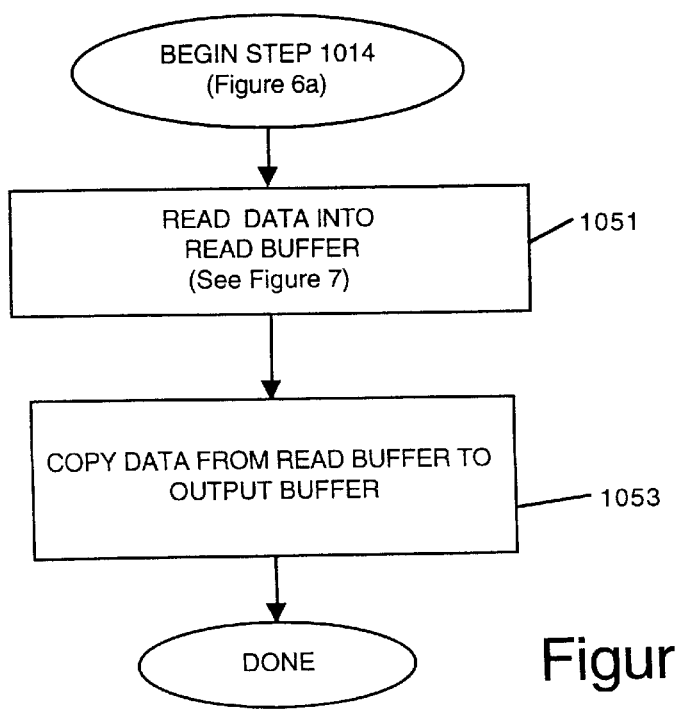

Turning now to FIGS. 6a, 6b and 6c a flowchart representing a read operation for an embodiment of the present invention is shown. When a user reads a portion of a file at a file offset the file system will retrieve the cluster that contains the bytes at the offset and return it to the user. The read operation begins by receiving input parameters. Four variables are input to the read operation: the Output Buffer, the Initial Output Buffer Size, the File Offset and the Open File Descriptor. The variable Output Buffer is an address that indicates a data buffer that will contain the data to be read from the disk. The Initial Output Buffer Size indicates the size of the Output Buffer in bytes. The File Offset is the offset in the file at which the data will be read. The Open File Descriptor allows the write operation to access the File Size. The Open File Descriptor may also point to the file directory and may be implemented as will be appreciated by one of skill in the art. The File Size indicates the size of the file that is being written to in bytes. One more variable is available from the file system meta data; the variable Cluster Size represents the size of a cluster in bytes. Also, the variable Number of Bytes Read is initialized to zero.

In step 1004 the File Offset is compared to the File Size. If File Offset is greater than or equal to the File Size this indicates that an attempt to read past the end of the file exists and the read procedure will return zero for Number of Bytes Read and end. On the other hand, if File Offset is less than File Size then control moves to step 1006. In step 1006, the Output Buffer Size is first set to the Initial Output Buffer Size. The Output Buffer Size may be further adjusted if it is determined that the read operation will request data past the end of the file. If the Output Buffer Size is greater than File Size minus File Offset, this means the request is past the end of the file. If so, Output Buffer Size is set to File Size minus File Offset.

In step 1008 two variables are computed, namely Start Cluster Index and Cluster Offset. The variable Start Cluster Index is the quotient of the File Offset divided by the Cluster Size. The Cluster Offset is the remainder of the File Offset divided by the Cluster Size. The variable Cluster Offset identifies the location within the cluster from where the data will be read. Once these variables are computed, two variables are initialized in step 1010. Cluster Index identifies the cluster to be read and it is set equal to the Start Cluster Index. The Output Buffer Offset indicates the point in the Output Buffer to store the data being read from disk, and it is initialized to zero. The Output Buffer Offset is the offset within the Output Buffer to store the data that will be read from the disk.

In step 1012 the variable Read Size is computed. This variable indicates the number of bytes to be read in one iteration of this operation and Read Size must be less than or equal to the size of a cluster. This step will be explained in more detail below with reference to FIG. 6b. In step 1014 a cluster is read from disk into the Output Buffer. This step will be explained in more detail below with reference to FIG. 6c. In step 1016 Output Buffer Size is decremented by Read Size to indicate the number of bytes to be read from disk. In step 1018 the variable Number of Bytes Read is incremented by Read Size to indicate the total number of bytes that have been read from the disk. Next, step 1020 tests whether the Output Buffer Size is equal to zero. If so, then Number of Bytes Read is returned and the read operation is complete. If not, then the read operation is not complete and control moves to step 1022. Step 1022 increments the cluster index by one in order to keep track of which cluster to read. Cluster index is used to index the conceptual array of the file in order to obtain the cluster number. Next in step 1024 the variable Output Buffer Offset is incremented by Read Size. In step 1026 the variable Cluster Offset is set equal to zero. From step 1026 control loops back to step 1012 and the operation continues to another iteration as discussed above.

FIG. 6b shows a flowchart to implement step 1012 of FIG. 6a for computing Read Size, the number of bytes to be read. In step 1031 Read Size is set equal to the Cluster Size minus the Cluster Offset. The Read Size must be less than or equal to the size of a cluster. In the first iteration of the read operation the Read Size may be smaller than a Cluster Size if there is a Cluster Offset. That is, if the data to be read from a disk begins in the middle of the cluster. On subsequent iterations through the read operation Read Size will be equal to the size of a cluster because the Cluster Offset will have been set to zero in step 1026. Step 1033 tests whether Read Size is greater than the Output Buffer Size. If the Read Size is not greater than the Output Buffer Size this indicates that the data remaining on the disk to be read to the Output Buffer is greater than or equal to the size of a cluster and the Read Size remains at the size of a cluster. This step 1012 is then done at this point.

However, if Read Size is greater than the Output Buffer Size, this indicates that the end of the Output Buffer has been reached, and that the data remaining to be read is less than the size of a cluster. In that case, in step 1035 Read Size is set equal to the data remaining to be read, namely, the Output Buffer Size. Note that the Output Buffer Size changes as iterations are made through the read operation because the variable Output Buffer Size is decremented by Read Size in step 1016. After step 1035, step 1012 is done.

FIG. 6c is a flowchart for executing the read cluster operation that is step 1014 of FIG. 6a. In step 1051 a cluster of data associated with Cluster Index is read from the disk and stored in the Read Buffer. This step 1051 is explained more fully below with reference to FIG. 7. In step 1053 a cluster of data is copied from the Read Buffer into the Output Buffer. This step may be performed by copying data in the Read Buffer from Cluster Offset for Read Size number of bytes to the Output Buffer at the offset Output Buffer Offset. After this step, step 1014 is done.

Figure 7:
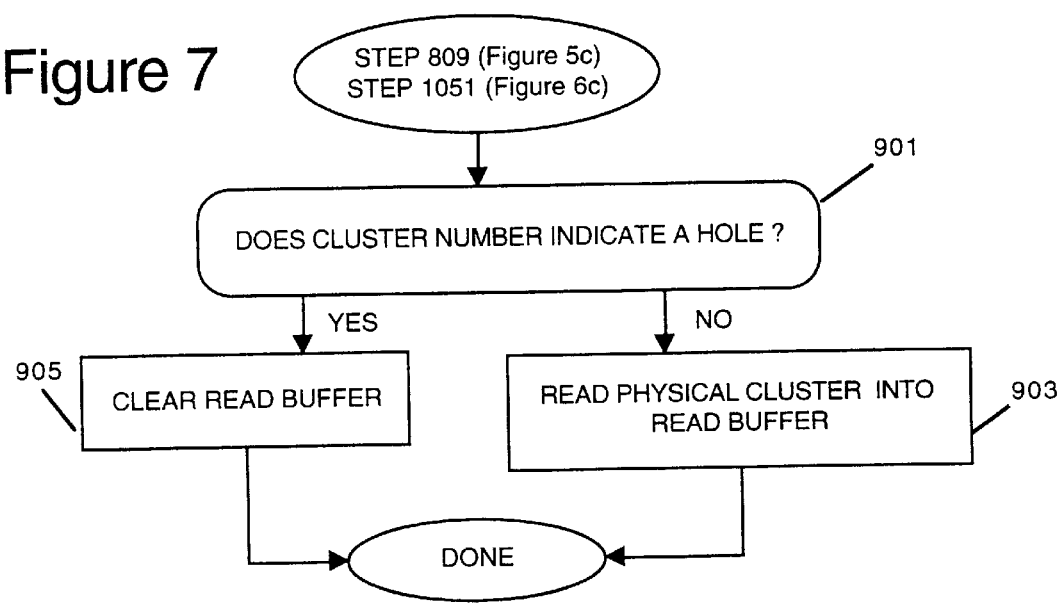
FIG. 7 is a flowchart representing a read operation for reading a cluster from disk into a read buffer that may be used in both the write and read operations in accordance with one embodiment of the present invention.

FIG. 7 is a flowchart for reading data represented in a file system and leaving this data in the Read Buffer. If the cluster of data is actually stored on disk it is read, but if the cluster is stored as a "hole" then the Read Buffer need only be cleared to zero. This flowchart corresponds to step 809 of FIG. 5c and step 1051 of FIG. 6c. Step 901 determines if the Cluster Number for the cluster to be read indicates that the cluster is stored as a "hole". The file system may indicate that a cluster is stored as a "hole" if its Cluster Number used as an index into the FAT or FAT extension is greater or equal to N, N being the number of clusters available on a disk. If the cluster is represented as a "hole" then in step 905 the Read Buffer is cleared. If not, then in step 903 the physical cluster on disk identified by Cluster Number is read into the Read Buffer. After these steps this flowchart is done.

Figure 8A:
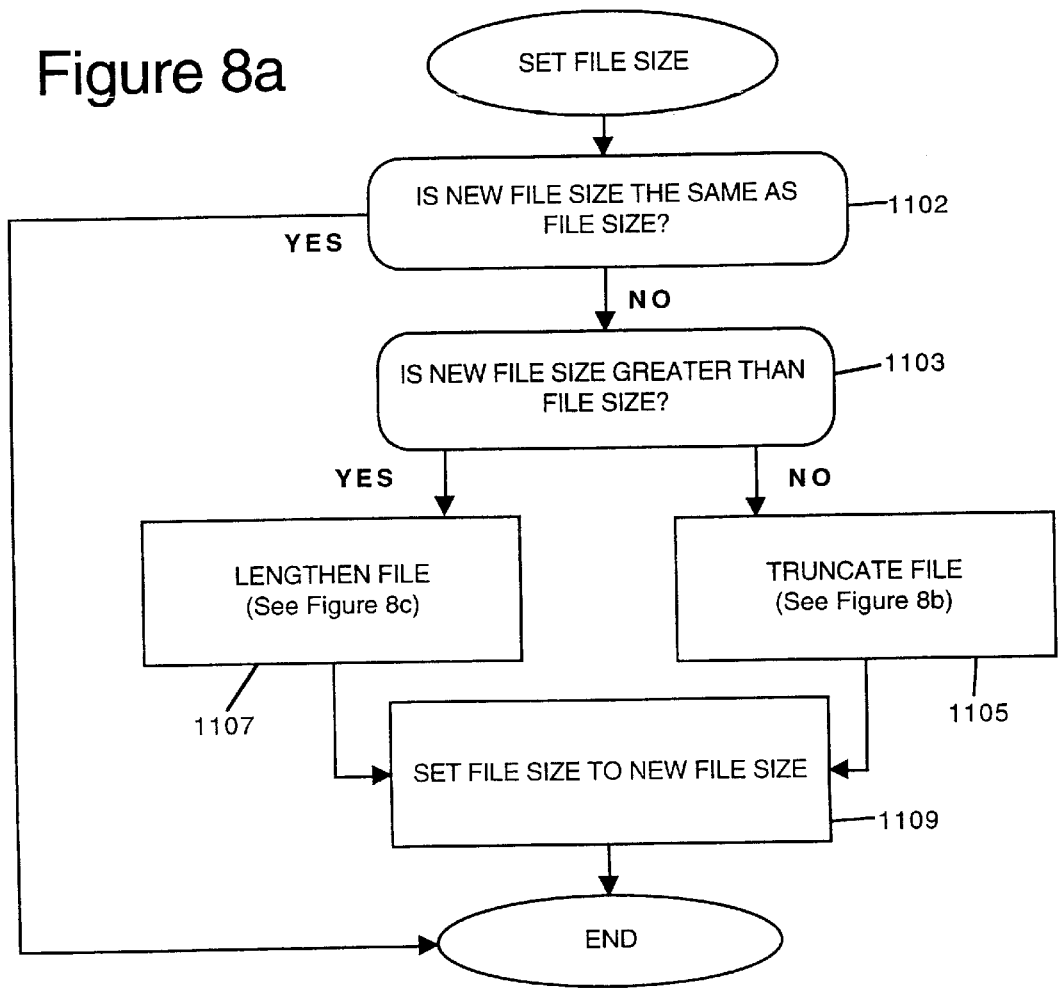
FIG. 8a is a flowchart representing a set file size operation in accordance with one embodiment of the present invention.

FIG. 8a is a flowchart for executing the set file size operation. The set file size operation is used by the file system to either decrease the size of a file on disk or to increase the size of a file on disk. It may also be used to reclaim space at the end of a file. By way of example, if a user is editing a file in the memory of the computer and decreases the size of that file, when that file is then written to disk the set file size operation may be used instead of the previously discussed write operation. The set file size operation may also be used to increase the size of a file. The result of the set file size operation is that the size of the file is changed from the old File Size to the New File Size that is input to the operation. The New File Size may be greater than, less than or equal to the old File Size. If the old File Size and New File Size are the same then no steps are performed. Otherwise the file is either lengthened or truncated.

The set file size operation begins by receiving as input the parameter New File Size that indicates in bytes the desired size of the new file and the parameter Open File Descriptor. In step 1102 the New File Size is compared to the current File Size. If both are the same then the set file size operation terminates. If they are not the same, then the New File Size is compared against the File Size in step 1103. If the New File Size is greater than File Size this indicates that the file must be lengthened and the lengthen file step 1107 is performed. This step will be explained in more detail below with reference to FIG. 8c. If New File Size is less than File Size this indicates that the file must be decreased in size and the truncate file step 1105 is performed. This step will be explained in more detail below with reference to FIG. 8b. In step 1109 the variable File Size is reset to New File Size. Next, the Meta data information for the file is updated and this Meta data is then written to disk; the set file size operation then terminates.

Figure 8B:
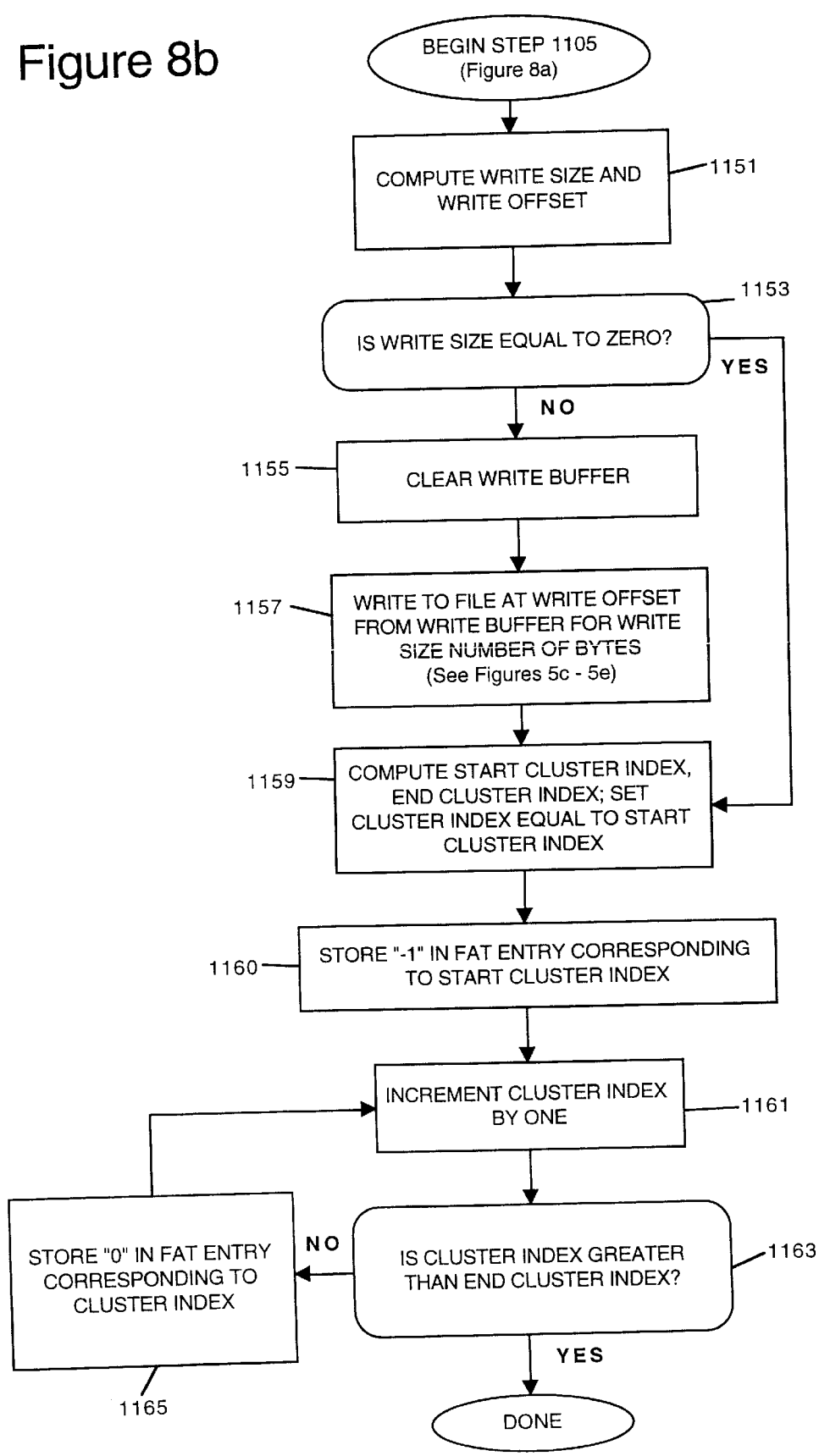

FIG. 8b is a flowchart for performing the truncate file step 1105 from FIG. 8a. The goal of the truncate file step is to zero out the bytes after the pointer New File Size to the end of the cluster. Then, any clusters after the cluster containing the offset New File Size are freed. In step 1151 the variables Write Size and Write Offset are computed. The variable Write Offset represents a pointer that indicates the location in the file from which the bytes must be zeroed out. The variable Write Offset is set equal to New File Size. The variable Write Size represents the number of remaining bytes at file offset New File Size up to the end of the cluster that must be zeroed out. The temporary variable Temporary Write Size is set equal to Cluster Size minus the remainder of New File Size divided by Cluster Size. Next, if New File Size equals zero or if Temporary Write Size equals Cluster Size then Write Size is set equal to zero. If not, Write Size is set equal to Temporary Write Size.

If Write Size equals zero then no bytes need to be zeroed out and clusters may be freed. In step 1153 if Write Size equals zero then control moves to step 1159, if not, then control moves to step 1155. In step 1155 the Write Buffer is cleared. The Write Buffer will have the size equal to Cluster Size. In step 1157 Write Size number of bytes will be written from the Write Buffer to the file starting at the Write Offset. Because this is a write operation, step 1157 may be implemented by using the write operation shown in FIGS. 5c to 5e. Four variables will be passed to this write operation. As described above, this write operation requires four inputs, namely, an Input Buffer, an Input Buffer Size, a File Offset and an Open File Descriptor. In step 1157 Write Buffer corresponds to Input Buffer, Write Size corresponds to Input Buffer Size, Write Offset corresponds to File Offset and the Open File Descriptor that identifies the current file that had been input to the set file size operation above is passed to the write operation.

Steps 1159 through 1165 represent the steps through which the remaining clusters after the cluster containing New File Size are freed up. In step 1159 the variables Start Cluster Index and End Cluster Index are computed. The Start Cluster Index is the quotient of the Write Offset divided by Cluster Size. The End Cluster Index is the quotient of File Size minus one, divided by Cluster Size. If, however, the Write Size is equal to zero, then Cluster Index should also be decremented by one after its value is computed. In step 1160 the last cluster of data for the file is indicated by storing a "−1" in the FAT entry that corresponds to the Start Cluster Index. The remaining clusters up to the cluster associated with End Cluster Index are no longer needed and will be freed by indicating in either the FAT or the FAT extension that the cluster is unallocated. In step 1161 Cluster Index is incremented by one. In step 1163 Cluster Index is compared to End Cluster Index. If Cluster Index is greater than End Cluster Index then this step 1105 of FIG. 8a is done. If not, then this indicates that a cluster needs to be freed. In step 1165 a "0" is stored in the FAT entry corresponding to the Cluster Index to indicate that the cluster associated with this Cluster Index is now unallocated. For a physical cluster on disk, a "0" in its corresponding FAT entry indicates that the cluster is now free. For a "hole" cluster, a "0" in its corresponding FAT extension entry indicates that this entry in the FAT extension no longer represents a "hole" for the current file and may be used to indicate a "hole" for another file if needed. After step 1165 the loop continues to step 1161, Cluster Index is incremented by one to indicate the next cluster, and operation continues as described above.

FIG. 8c shows step 1107 from FIG. 8a which is the lengthen file step. The goal of this lengthen file step is to zero out all the bytes after the old File Size to the end of the cluster. Then, any clusters after the cluster containing the offset old File Size are marked as holes. In step 1131 the variables Write Size and Write Offset are computed. The variable Write Offset represents a pointer that indicates the location after the file from which the bytes must be zeroed out. The variable Write Offset is set equal to Old File Size. The variable Write Size represents the number of remaining bytes at file offset Old File Size up to the end of the cluster that must be zeroed out. Next, the temporary variable Temporary Write Size is set equal to Cluster Size minus the remainder of the Old File Size divided by Cluster Size. Next, if the File Size equals zero or if Temporary Write Size equals Cluster Size then Write Size is set equal to zero. Otherwise, Write Size is set equal to Temporary Write Size.

If Write Size equals zero then no bytes need to be zeroed out and clusters following may be marked as holes. In step 1133 if Write Size equals zero then control moves to step 1139, if not, then control moves to step 1135. In step 1135 the Write Buffer is cleared. The Write Buffer will have a size equal to Cluster Size. In step 1137 Write Size number of bytes will be written from the Write Buffer to the file starting at the Write Offset. Because this is a write operation, step 1137 may be implemented by using the write operation shown in FIGS. 5c to 5e. Four variables will be passed to this write operation. As described above, this write operation requires four inputs, namely, an Input Buffer, an Input Buffer Size, a File Offset and an Open File Descriptor. In step 1137 Write Buffer corresponds to the Input Buffer, Write Size corresponds to Input Buffer Size, Write Offset corresponds to File Offset and the Open File Descriptor that identifies the current file that had been input to the set file size operation above is also passed to the write operation. After the write operation is complete, control moves to step 1139.

Steps 1139 though 1149 perform the function of marking all the clusters after the cluster containing the variable old File Size as "holes". In step 1139 the variables Start Cluster Index and End Cluster Index are computed. The Start Cluster Index is the quotient of the Write Offset divided by Cluster Size. The End Cluster Index is the quotient of New File Size minus one, divided by Cluster Size. If, however, the Write Size is equal to zero, then Cluster Index should also be decremented by one after computing its value. In step 1141 Cluster Index is incremented by one. In step 1143 Cluster Index is compared to End Cluster Index. If Cluster Index is greater than End Cluster Index then step 1107 is done. If not, more clusters need to be marked as "holes". In step 1145 a new cluster is allocated in the FAT extension in order to represent a cluster as a "hole". This allocation may be done simply by identifying a FAT entry in the FAT extension that has a value of "0" indicating that this cluster has not been allocated as a "hole" yet. In step 1147 the linked list representing all of the clusters in the current file is updated to reflect that a new "hole" has been added to the file. The FAT entry that corresponds to the previous cluster index is set to the cluster number for the newly allocated cluster. In this fashion, the previous cluster now points to the new "hole" that has just been allocated. Next in step 1149, the file must be terminated. Accordingly, the FAT entry corresponding to the new Cluster Number is set to a "−1" to indicate that this is the last cluster in the file. If more "holes" are added in subsequent steps 1141 through 1147 then this last cluster will have its FAT entry changed to point to a new last cluster. After step 1149 the loop continues to step 1141, Cluster Index is incremented by one indicating the next cluster, and operation continues as above.

An aspect of the present invention also relates to the compression of files and their representation in a file system. Data compression software may be implemented either at the sector level or at the file system level. Sector level compression schemes compress a disk's entire contents, including file system meta-data. They work between a file system and the disk driver, compressing data as they are written to the disk and automatically expanding the data when reading from the disk. Examples of products based upon both file and sector level compression are "Stacker" available from STAC ELECTRONICS corporation, and "DoubleSpace" and "DriveSpace" available from MICROSOFT Corporation. The book "PC Intern System Programming", Michael Tischer, Abacus/Data Becker, 5th edition, 1995 also describes the "DoubleSpace" product. The paper "On-line Data Compression in a Log-structured File System" by M. Burrows, C. Jerian, B. Lampson and T. Mann, Proceedings of the 5th International Conference on Architectural Support for Programming Languages and Operating Systems, 1992, describes file system level compression in general.

In this aspect of the present invention, the representation of "holes" in the FAT extension are used to represent files that have been compressed, thus allowing both compressed and expanded files on a disk to coexist. A method that utilizes "holes" within a file system in order to represent compressed files at the file system level without changing the underlying file system format is described in the patent application "File System Level Compression Using Holes" by inventors Madany, Wong and Nelson, filed on Mar. 27, 1996, Ser. No. 08/623,907 and is hereby incorporated by reference in its entirety.

In this aspect of the invention, a compression unit is used to compress a file. The compression ratio (compressed output size divided by expanded input size) decreases when the input size increases. In this aspect of the invention, a file is divided into a set of fixed size compression units, where the size of each compression unit is a multiple of the cluster size. Preferably, a compression unit is at least four or more times the size of a cluster. For compression, an embodiment of the present invention system accumulates data until the amount of modified data reaches or exceeds the size of a compression unit. The data is then compressed and written back to the disk. When a user reads a compressed file at offset N, the FAT file system will retrieve the stored compression unit that contains the bytes at offset N. It then expands the data and returns them to the user.

If a compression unit having N clusters is compressed, and if the compression process successfully reduces the number of clusters needed to store the unit, then the FAT file system will store the unit using M clusters, where M<N. When the compressed data of a unit is written to the disk, the clusters (N−M) at the end of the compression unit that were compressed away are treated as "holes" and represented in the FAT extension. If the compression fails to reduce the number of clusters needed to store the data, then the compression unit will be stored in its expanded form.

In order to distinguish "holes" resulting from compressing a file from "holes" due to a file simply having a cluster full of zeros, in another aspect of the invention even numbered Cluster Numbers of a FAT extension will be used to represent "holes" that are not the result of compression and odd numbered Cluster Numbers will be used to represent "holes" that are the result of compression. Thus, in this aspect of the present invention, only one additional FAT extension would be needed to represent "holes" within the file system. This FAT extension may be used to represent compressed files with holes and also expanded files that have clusters that are zero. It is also contemplated that additional FAT extensions may be used to represent different compression algorithms used in the file system. For example, a first FAT extension may be used to represent only "holes" due to files that have zero clusters. Second and third FAT extensions may be implemented that would represent "holes" created by two different compression algorithms that are used in the file system. That is, files that have "holes" due to compression by the first compression algorithm would have these "holes" represented in the second FAT extension, and files that have "holes" due to compression by the second compression algorithm would have these "holes" represented in the third FAT extension. In this manner, the file system would know which compression algorithm should be used to expand a compression unit based upon from which FAT extension the "holes" came.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include machine code, such as produced by a compiler, and higher level code that can be executed by an interpreter.

Figure 9:
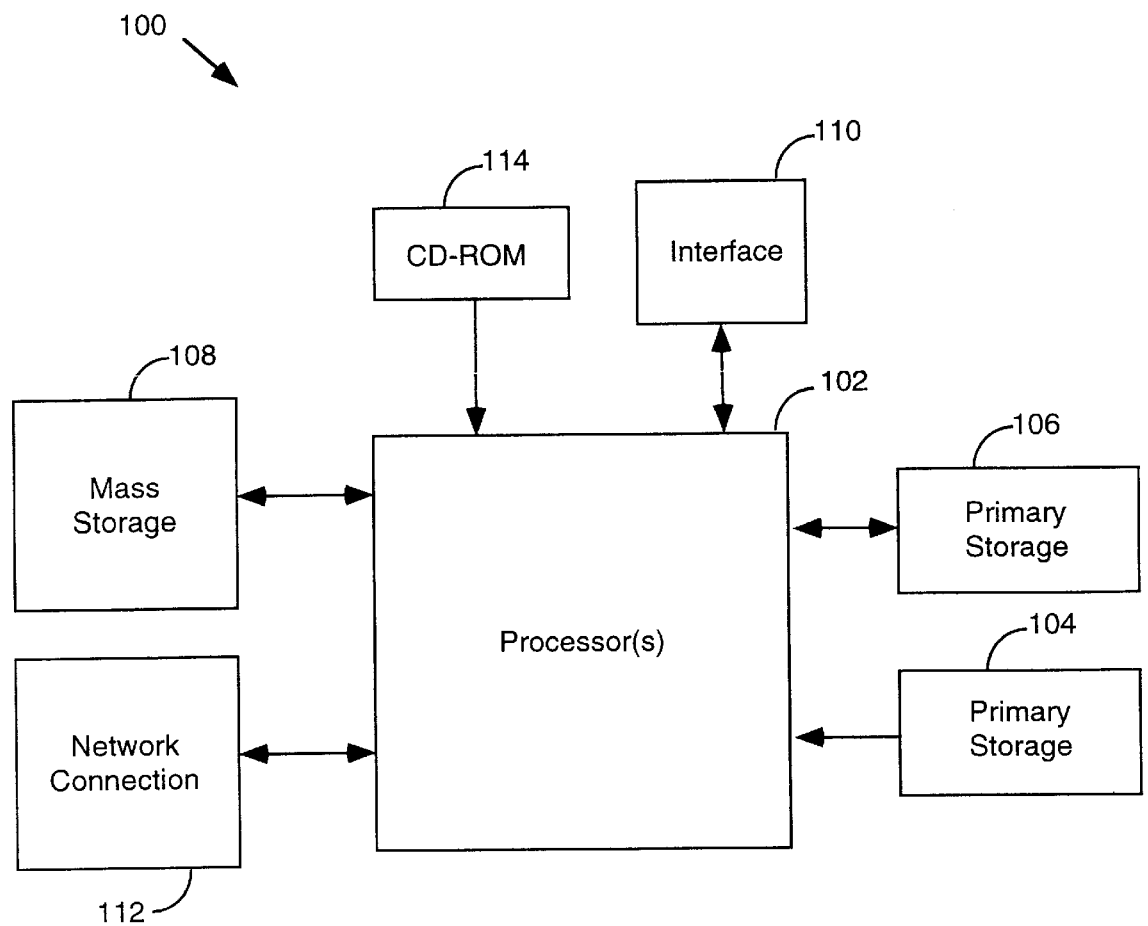
FIG. 9 shows a typical computer system suitable for implementing the present invention.

FIG. 9 illustrates a typical computer system in accordance with the present invention. The computer system 100 includes any number of processors 102 (also referred to as central processing units, or CPUs) that are coupled to storage devices including primary storage 106 (typically a random access memory, or RAM), primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable media described above. A mass storage device 108 is also coupled bi-directionally to CPU 102 and provides additional data storage capacity and may include any of the computer-readable media described above. The mass storage device 108 may be used to store programs, data and the like and is typically a secondary storage medium such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of understanding, it will be apparent that certain modifications may be practiced within the scope of the appended claims. For instance, a "hole" need not be a data segment of all zeroes, but may also be any segment that is not desired to be written to disk. Also, the novel file system described may include any number of file allocation table extensions. Each FAT extension may represent holes in the data that is produced by a different compression algorithm, while one FAT extension may be reserved to represent holes that naturally occur in the data. Therefore, the described embodiments should be taken as illustrative and not restrictive, and the invention should not be limited to the details given herein but should be defined by the following claims and their full scope of equivalents.

We claim:

1. A computer-implemented method of storing data using a file system that includes a file allocation table (FAT) having a plurality of FAT elements, each FAT element of the file allocation table corresponding to a unique region of mass storage and being arranged to represent the status of that unique region of mass storage, the method comprising the steps of:

a) requesting that a first data segment be written to mass storage;

b) determining whether the first data segment may be represented by a hole; and c) wherein when it is determined that the first data segment may be represented by a hole, the method further includes the step of storing a first status indicator in a file allocation table extension at a first extension element, said file allocation table extension being included in said file system and having a plurality of extension elements, wherein said extension elements of said file allocation table extension do not correspond to any region in mass storage, thereby indicating that the first data segment is not stored in the mass storage of the computer.

2. A method as recited in claim 1 wherein the data to be stored includes a plurality of data segments including the first data segment and the first status indicator is arranged to indicate one of:

a location in the file system where a next one of the plurality of data segments is represented; and that the first data segment is a terminating data segment.

3. A method as recited in claim 2 wherein a plurality of status indicators are available for use, each of said data segments is a cluster and said clusters stored in the file system are linked via the status indicators.

4. A method as recited in claim 1 wherein the step of determining whether the first data segment represents a hole includes the sub-step of determining whether the first data segment is a uniform sequence of bits that does not need to be represented in mass storage.

5. A method as recited in claim 1 wherein the file system includes a plurality of file allocation table extensions wherein a first one of the file allocation table extensions is arranged to indicate holes in the data to be stored and a second one of the file allocation table extensions is arranged to indicate data segments that are compressed.

6. A method as recited in claim 2 wherein the file system further includes a file table, the method further comprising the step of storing an initial status indicator in the file table that indicates where an initial one of the plurality of data segments is represented in the file system.

7. A computer-implemented method of storing data for a first file in a file system of a computer, the file system including a file allocation table (FAT) having a plurality of FAT elements, each FAT element of the file allocation table being indexed by an associated segment number that corresponds to a unique region of mass storage and each FAT element representing the status of the region in mass storage to which its associated segment number corresponds, the first file having a plurality of data segments, the method comprising the steps of:

a) requesting that a first data unit be written to mass storage, the first data unit corresponding to a first data segment within the plurality of data segments;

b) determining whether the first data segment is represented as a hole in a file allocation table extension, said file allocation table extension being included in said file system and having a plurality of extension elements, said extension elements of said file allocation table extension being indexed by an associated extension number that does not correspond to a region in mass storage, said plurality of data segments of said first file being represented in a linked fashion in the file allocation table and in said file allocation table extension;

c) wherein when it is determined that the first data segment is represented as a hole in the file allocation table extension, the method further includes the steps of, d) allocating space in mass storage for the first data segment, e) writing the first data unit to the space allocated for the first data segment, f) updating the file allocation table and the file allocation table extension to reflect that the first data segment is no longer a hole.

8. A method as recited in claim 7 wherein each of the plurality of data segments is represented by an associated status indicator in one of the file allocation table and the file allocation table extension, and wherein the step of determining whether the first data segment is represented as a hole in the file allocation table extension is performed by reference to a status indicator associated with a previous one of the plurality of data segments.

9. A method as recited in claim 8 wherein the step of updating the file allocation table and the file allocation table extension comprises the sub-steps of:

g) copying the status indicator in the file allocation table extension corresponding to the first data segment to a location in the file allocation table corresponding to the space allocated in mass storage for the first data segment; and h) setting the status indicator for the previous data segment to a value indicative of the space allocated in mass storage for the first data segment.

10. A method as recited in claim 8 wherein each status indicator is arranged to indicate one of:

a location in the file system where a next one of the plurality of data segments is represented; and that the associated data segment is a terminating data segment.

11. A method as recited in claim 7 wherein the step of determining whether the first data segment is represented as a hole in the file allocation table extension includes the sub-step of determining whether the first data segment is a uniform sequence of bits that does not need to be represented in mass storage.

12. A method as recited in claim 7 wherein the file system includes a plurality of file allocation table extensions wherein a first one of the file allocation table extensions is arranged to indicate holes in the data to be stored and a second one of the file allocation table extensions is arranged to indicate data segments that are compressed.

13. A computer-implemented method of retrieving data of a first file from mass storage in a file system of a computer, the file system including a file allocation table (FAT) having a plurality of FAT elements, each FAT element of the file allocation table being indexed by an associated segment number that corresponds to a unique region of mass storage and each FAT element representing the status of the region in mass storage to which its associated segment number corresponds, the first file having a plurality of data segments, the method comprising the steps of:

requesting that a first one of the plurality of data segments of the first file be read from mass storage;

determining whether the first data segment is represented in one of the file allocation table and a file allocation table extension by reference to one of a first segment number and a first extension number that is associated with the first data segment, said file allocation table extension being included in said file system and having a plurality of extension elements, the extension elements of the file allocation table extension being indexed by an associated extension number that does not correspond to a region in mass storage, said plurality of data segments being represented in a linked fashion in the file allocation table and in the file allocation table extension; and wherein when it is determined that the first data segment is represented as a hole in the file allocation table extension, the method further includes the step of setting a read buffer of the computer to a value associated with the hole.

14. A method as recited in claim 13 further comprising the step of requesting that a next one of the plurality of data segments of the first file be read from mass storage, wherein when it is determined that the first data segment is represented in the file allocation table, the location of the next data segment to be read is determined by reference to a first FAT element associated with the first segment number, and wherein when it is determined that the first data segment is represented in the file allocation table extension, the location of the next data segment to be read is determined by reference to a first extension element associated with a first extension number.

15. A file system embodied in a computer-readable medium, the file system arranged to store data to mass storage for a first file having a first file name and a plurality of data segments, the file system comprising:

a file table having a plurality of file name elements and a plurality of corresponding initial status indicator elements, the file table arranged to store the first file name as one of said plurality of file name elements;

a file allocation table (FAT) having a plurality of FAT elements, each FAT element of the file allocation table corresponding to a unique region of mass storage and representing the status of that unique region in mass storage; and a file allocation table extension having a plurality of extension elements, wherein the extension elements of the file allocation table extension do not correspond to a region in mass storage, whereby those data segments of the plurality of data segments that may not be represented by a hole are represented in the file allocation table, and those data segments of the plurality of data segments that may be represented by a hole are represented in the file allocation table extension.

16. A file system as recited in claim 15 further comprising a file allocation table compression extension having a plurality of compression extension elements, wherein the compression extension elements of the file allocation table compression extension do not correspond to a region in mass storage, whereby those data segments of the plurality of data segments that are compressed may be represented in the file allocation table compression extension.

17. A computer apparatus for use in storing data, the computer apparatus comprising:

a central processing unit;

a mass storage device in communication with the central processing unit;

a random access memory in communication with the central processing unit; and a file system embodied in the random access memory, the file system arranged to store data to mass storage for a first file having a first file name and a plurality of data segments, the file system including, a file table having a plurality of file name elements and a plurality of corresponding initial status indicator elements, the file table arranged to store the first file name as one of said plurality of file name elements, a file allocation table (FAT) having a plurality of FAT elements, each FAT element of the file allocation table corresponding to a unique region of mass storage and representing the status of that unique region in mass storage, and a file allocation table extension having a plurality of extension elements, wherein the extension elements of the file allocation table extension do not correspond to a region in mass storage, whereby those data segments of the plurality of data segments that may not be represented by a hole are represented in the file allocation table, and those data segments of the plurality of data segments that may be represented by a hole are represented in the file allocation table extension.

18. A computer program product comprising a computer-usable medium having computer-readable program code embodied thereon for storing data using a file system that includes a file allocation table (FAT) having a plurality of FAT elements, each FAT element of the file allocation table corresponding to a unique region of mass storage and being arranged to represent the status of that unique region of mass storage, the computer program product comprising program code for effecting the following steps in the computer:

requesting that a first data segment be written to mass storage;

determining whether the first data segment may be represented by a hole; and storing a first status indicator in a file allocation table extension at a first extension element, said file allocation table extension being included in said file system and having a plurality of extension elements, wherein the extension elements of said file allocation table extension do not correspond to any region in mass storage, thereby indicating that the first data segment is not stored in the mass storage of the computer.

19. A computer program product as recited in claim 18 wherein the data to be stored includes a plurality of data segments including the first data segment and the first status indicator is arranged to indicate one of:

a location in the file system where a next one of the plurality of data segments is represented; and that the first data segment is a terminating data segment.

20. A computer program product as recited in claim 19 further comprising program code for repeating the steps of requesting, determining, writing and storing for an additional plurality of data segments.

21. A computer program product as recited in claim 19 wherein a plurality of status indicators are available for use, each of said data segments is a cluster and said clusters stored in the file system are linked via the status indicators.

22. A computer program product as recited in claim 18 wherein the program code for determining whether the first data segment represents a hole includes program code for determining whether the first data segment is a uniform sequence of bits that does not need to be represented in mass storage.

23. A computer program product as recited in claim 18 wherein the file system includes a plurality of file allocation table extensions wherein a first one of the file allocation table extensions is arranged to indicate holes in the data to be stored and a second one of the file allocation table extensions is arranged to indicate data segments that are compressed.

24. A computer program product as recited in claim 19 wherein the file system further includes a file table, the product further comprising program code for storing an initial status indicator in the file table that indicates where an initial one of the plurality of data segment is represented in the file system.

25. A computer program product comprising a computer-usable medium having computer-readable program code embodied thereon for storing data for a first file in a file system of a computer, the file system including a file allocation table (FAT) having a plurality of FAT elements, each FAT element of the file allocation table being indexed by an associated segment number that corresponds to a unique region of mass storage and each FAT element representing the status of the region in mass storage to which its associated segment number corresponds, the first file having a plurality of data segments, the computer program product comprising program code for effecting the following steps in the computer:

a) requesting that a first data unit represented in a memory of the computer be written to mass storage, the first data unit corresponding to a first data segment within the plurality of data segments;

b) determining whether the first data segment is represented as a hole in a file allocation table extension, said file allocation table extension being included in said file system and having a plurality of extension elements, the extension elements of said file allocation table extension being indexed by an associated extension number that does not correspond to a region in mass storage, said plurality of data segments being represented in a linked fashion in the file allocation table and in said file allocation table extension;

c) wherein when it is determined that the first data segment is represented as a hole in the file allocation table extension, the product further includes program code for, d) allocating space in mass storage for the first data segment, e) writing the first data unit to the space allocated for the first data segment, f) updating the file allocation table and the file allocation table extension to reflect that the first data segment is no longer a hole.

26. A computer program product as recited in claim 25 wherein each of the plurality of data segments is represented by an associated status indicator in one of the file allocation table and the file allocation table extension, and wherein the program code for determining whether the first data segment is represented as a hole in the file allocation table extension includes program code for referencing a status indicator associated with a previous one of the plurality of data segments.

27. A computer program product as recited in claim 26 wherein the program code for updating the file allocation table and the file allocation table extension includes program code for:

g) copying the status indicator in the file allocation table extension corresponding to the first data segment to a location in the file allocation table corresponding to the space allocated in mass storage for the first data segment; and h) setting the status indicator for the previous data segment to a value indicative of the space allocated in mass storage for the first data segment.

28. A computer program product as recited in claim 26 wherein each status indicator is arranged to indicate one of:

a location in the file system where a next one of the plurality of data segments is represented; and that a data segment is a terminating data segment.

29. A computer program product as recited in claim 25 wherein the program code for determining whether the first data segment is represented as a hole in the file allocation table extension includes program code for determining whether the first data segment is a uniform sequence of bits that does not need to be represented in mass storage.

30. A computer program product as recited in claim 25 wherein the file system includes a plurality of file allocation table extensions wherein a first one of the file allocation table extensions is arranged to indicate holes in the data to be stored and a second one of the file allocation table extensions is arranged to indicate data segments that are compressed.

31. A computer program product comprising a computer-usable medium having computer-readable code embodied thereon for retrieving data of a first file from mass storage in a file system of a computer, the file system including a file allocation table (FAT) having a plurality of FAT elements, each FAT element of the file allocation table being indexed by an associated segment number that corresponds to a unique region of mass storage and each FAT element representing the status of the region in mass storage to which its associated segment number corresponds, the first file having a plurality of data segments, the computer program product comprising computer-readable program code for effecting the following steps within the computer system:

requesting that a first one of the plurality of data segments of the first file be read from mass storage;

determining whether the first data segment is represented in one of the file allocation table and a file allocation table extension by reference to one of a first segment number and a first extension number that is associated with the first data segment, said file allocation table extension having a plurality of extension elements, the extension elements of said file allocation table extension being indexed by an associated extension number that does not correspond to a region in mass storage, said plurality of data segments being represented in a linked fashion in the file allocation table and in said file allocation table extension; and wherein when it is determined that the first data segment is represented as a hole in the file allocation table extension, the method further includes the step of setting a read buffer of the computer to a value associated with the hole.

32. A computer program product as recited in claim 31 further comprising computer-readable program code for requesting that a next one of the plurality of data segments of the first file be read from mass storage, wherein when it is determined that the first data segment is represented in the file allocation table, the location of the next data segment to be read is determined by reference to a first FAT element associated with the first segment number, and wherein when it is determined that the first data segment is represented in the file allocation table extension, the location of the next data segment to be read is determined by reference to a first extension element associated with a first extension number.

33. A computer-implemented method of transmitting computer-readable program code for storing data using a file system that includes a file allocation table (FAT) having a plurality of FAT elements, each FAT element of the file allocation table corresponding to a unique region of mass storage and being arranged to represent the status of that unique region of mass storage, the program code effecting the following steps in the computer, requesting that a first data segment be written to mass storage, determining whether the first data segment may be represented by a hole, and storing a first status indicator in a file allocation table extension at a first extension element, said file allocation table extension being included in said file system and having a plurality of extension elements, wherein the extension elements of the file allocation table extension do not correspond to any region in mass storage, thereby indicating that the first data segment is not stored in the mass storage of the computer, the method comprising the steps of:

storing the program code onto a computer-usable medium;

receiving a request for the transmission of the program code; and transmitting the program code over a network to a remote location on the network.

34. A computer-implemented method of transmitting computer-readable program code for storing data for a first file in a file system of a computer, the file system including a file allocation table (FAT) having a plurality of FAT elements, each FAT element of the file allocation table being indexed by an associated segment number that corresponds to a unique region of mass storage and each FAT element representing the status of the region in mass storage to which its associated segment number corresponds, the first file having a plurality of data segments, the program code effecting the following steps in the computer, requesting that a first data unit represented in a memory of the computer be written to mass storage, the first data unit corresponding to a first data segment within the plurality of data segments, determining whether the first data segment is represented as a hole in a file allocation table extension, said file allocation table extension being included in said file system and having a plurality of extension elements, the extension elements of said file allocation table extension being indexed by an associated extension number that does not correspond to a region in mass storage, said plurality of data segments being represented in a linked fashion in the file allocation table and in said file allocation table extension, wherein when it is determined that the first data segment is represented as a hole in the file allocation table extension, the product further includes program code for, allocating space in mass storage for the first data segment, writing the first data unit to the space allocated for the first data segment, updating the file allocation table and the file allocation table extension to reflect that the first data segment is no longer a hole, the method comprising the steps of:

storing the program code onto a computer-usable medium;

receiving a request for the transmission of the program code; and transmitting the program code over a network to a remote location on the network.

35. A computer-implemented method of transmitting computer-readable program code for retrieving data of a first file from mass storage in a file system of a computer, the file system including a file allocation table (FAT) having a plurality of FAT elements, each FAT element of the file allocation table being indexed by an associated segment number that corresponds to a unique region of mass storage and each FAT element representing the status of the region in mass storage to which its associated segment number corresponds, the first file having a plurality of data segments, the program code effecting the following steps within the computer system, requesting that a first one of the plurality of data segments of the first file be read from mass storage, determining whether the first data segment is represented in one of the file allocation table and a file allocation table extension by reference to one of a first segment number and a first extension number that is associated with the first data segment, said file allocation table extension being included in said file system and having a plurality of extension elements, the extension elements of said file allocation table extension being indexed by an associated extension number that does not correspond to a region in mass storage, said plurality of data segments being represented in a linked fashion in the file allocation table and in said file allocation table extension, and wherein when it is determined that the first data segment is represented as a hole in the file allocation table extension, the method further includes the step of setting a read buffer of the computer to a value associated with the hole, the method comprising the steps of:
  storing the program code onto a computer-usable medium;
  receiving a request for the transmission of the program code; and
  transmitting the program code over a network to a remote location on the network.

* * * * *